United States Patent
Yeh et al.

(12) 
(10) Patent No.: US 6,563,511 B1
(45) Date of Patent: May 13, 2003

(54) ANTI-FLICKERING FOR VIDEO DISPLAY BASED ON PIXEL LUMINANCE

(75) Inventors: Gerard K. Yeh, Redwood City, CA (US); Anoush Khazeni, Sunnyvale, CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/263,121

(22) Filed: Mar. 5, 1999

(51) Int. Cl.[7] ................................................. G09G 5/00
(52) U.S. Cl. ........................ 345/611; 348/446; 348/447; 348/90; 345/589; 345/618; 345/643; 345/660; 345/690; 345/698; 382/260; 382/261; 382/263; 382/264; 382/270; 382/274
(58) Field of Search ................................. 348/446, 447, 348/910; 345/589, 618, 643, 660, 3.3, 690, 698; 382/260, 261, 263, 264, 270, 274, 275, 299

(56) References Cited

U.S. PATENT DOCUMENTS 5,910,820 A * 6/1999 Herz et al. ............... 348/446

6,297,847 B1 * 10/2001 Fisch ........................ 348/447

* cited by examiner

Primary Examiner—Michael Razavi
Assistant Examiner—Javid Amini
(74) Attorney, Agent, or Firm—Blakely, Sokoloff, Taylor & Zafman LLP

(57) ABSTRACT

The present invention is a method and apparatus to generate an anti-flickered pixel from a source pixel having a source pixel value in a display memory. The apparatus comprises a plurality of storage elements, a filter, a comparator, and an output selector. The plurality of storage elements store a sequence of pixels in the display memory which includes the source pixel. The filter is coupled to the plurality of storage elements to filter the sequence of pixels. The filter generates a filtered pixel corresponding to the source pixel. The comparator is coupled to the plurality of storage elements to compare the source pixel value with a threshold value. The comparator generates a comparison result. The output selector is coupled to the filter and the storage elements to select one of the source and filtered pixels according to the comparison result. The selected one of the source and filtered pixels is the anti-flickered pixel.

24 Claims, 16 Drawing Sheets

ANTI-FLICKERING FOR VIDEO DISPLAY BASED ON PIXEL LUMINANCE

BACKGROUND

1. Field of the Invention

This invention relates to graphics. In particular, the invention relates to graphics and video processing.

2. Description of Related Art

Graphics and video systems are now being used in various platforms that are beyond the traditional applications. There is a growing need for the integration of computer-generated graphics and real-time video images in applications ranging from personal computers (PC), video conferences, to television (TV) set-top boxes. Demands for these high performance graphics and video processing systems have created many design challenges.

In a typical high performance graphics and video systems, there may be different display systems with different display formats. These different display formats may create many incompatibility problems. One problem is the difference in the aspect ratio of the display area. For example, a computer-generated image may look fine on a computer monitor but is distorted when displayed on a TV monitor. In another example, a digital image displayed on one display resolution may look different on another display resolution.

Display on a monitor may also be flickered producing undesirable viewing effects. The flickering may be a result of high frequency update rate of the horizontal lines, or the interlacing of fields in interlaced display mode. To reduce the flickering, traditional methods employ analog techniques using delay elements and switching circuits. These methods are inflexible, unreliable, and tend to be expensive.

Therefore there is a need in the technology to provide an efficient and versatile technique for processing graphical data to correct the aspect ratio and to reduce flickering.

SUMMARY

The present invention is a method and apparatus to generate an anti-flickered pixel from a source pixel having a source pixel value in a display memory. The apparatus comprises a plurality of storage elements, a filter, a comparator, and an output selector. The plurality of storage elements store a sequence of pixels in the display memory which includes the source pixel. The filter is coupled to the plurality of storage elements to filter the sequence of pixels. The filter generates a filtered pixel corresponding to the source pixel. The comparator is coupled to the plurality of storage elements to compare the source pixel value with a threshold value. The comparator generates a comparison result. The output selector is coupled to the filter and the storage elements to select one of the source and filtered pixels according to the comparison result. The selected one of the source and filtered pixels is the anti-flickered pixel.

BRIEF DESCRIPTION OF THE DRAWINGS

The features and advantages of the present invention will become apparent from the following detailed description of the present invention in which.

DESCRIPTION

The present invention is a method and apparatus for correcting the display aspect ratio and performing anti-flickering on video data. The technique uses pipelined horizontal and vertical filters. A memory access pattern is used to provide increased or potentially maximum utilization of memory data rates.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
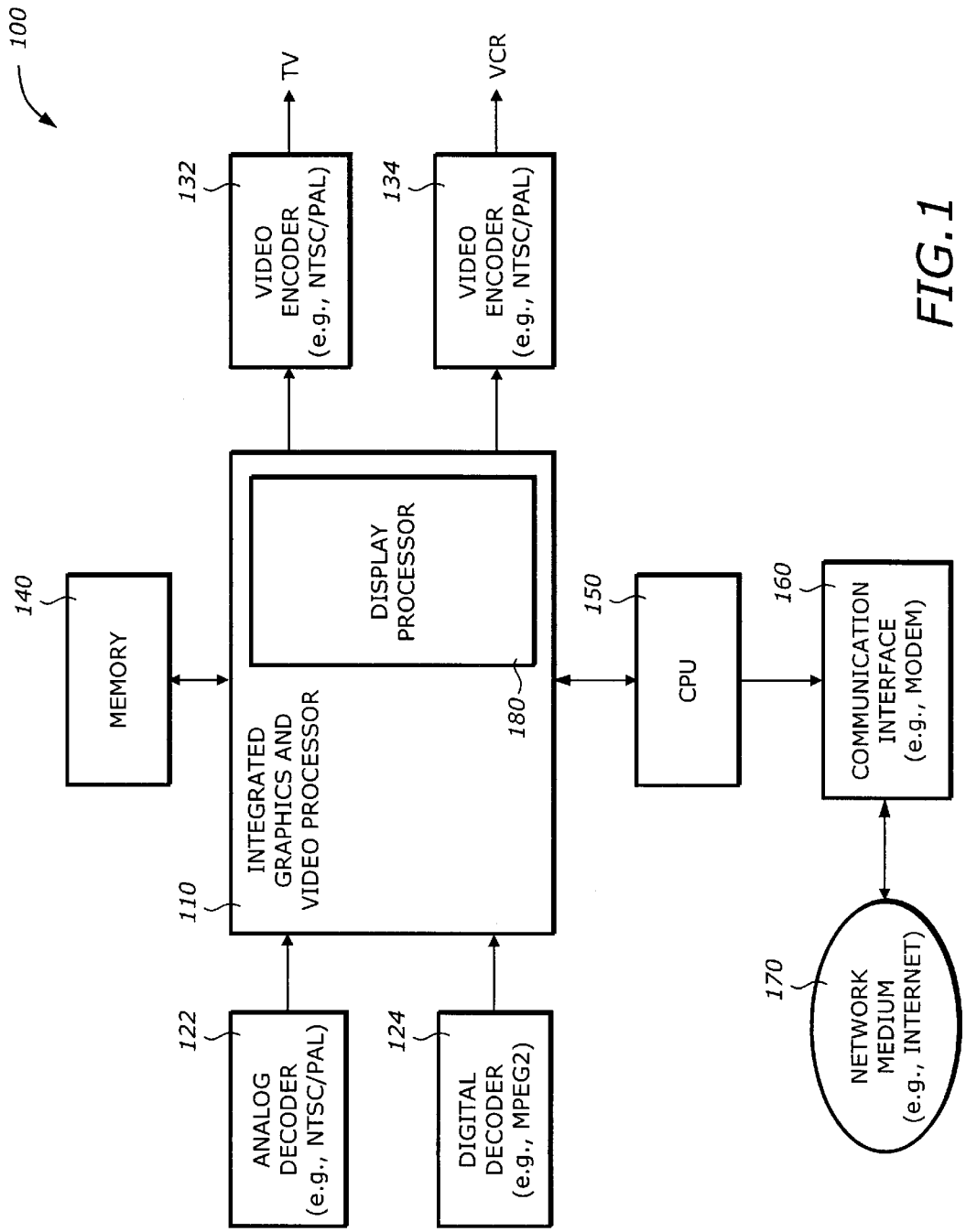
FIG. 1 is a diagram illustrating a video and graphics system in which one embodiment of the invention can be practiced.

FIG. 1 is a diagram illustrating a video and graphics system 100 in which one embodiment of the invention can be practiced. The system 100 includes an integrated graphics and video processor 110, an analog decoder 122, a digital decoder 124, video encoders 132 and 134, a memory 140, a central processing unit (CPU) 150, a communication interface 160, and a network medium 170.

The integrated graphics and video processor 110 is a high performance processor dedicated for graphics and video processing. It can be used in a number of applications including set-top boxes and other television (TV)-based digital systems. The integrated graphics and video processor 110 includes a display processor 180. The display processor 180 processes the graphic data and generates the result to the video encoders 132 and 134.

The analog decoder 122 processes analog video signals and presents digital data to the integrated graphics and video processor 110 in proper formats. The analog decoder 122 decodes and digitizes the analog video signals into digital data. In one embodiment, the analog video signal is an NTSC or PAL signal, and the decoded digital data format is YcbCr 4:2:2 digital video. As is known by one skilled in the art, other types of analog video signals and digital data formats can be used.

The digital decoder 124 processes the digital data and decodes the data into appropriate channels and formats to the integrated graphics and video processor 110. In one embodiment, the digital data follow the Moving Picture Expert Group (MPEG) standards. Examples of the MPEG standards include MPEG-2, MPEG-4, and MPEG-7. The digital data may include multimedia information such as moving picture and stereo audio.

The video encoders 132 and 134 are devices or equipment that converts the digital output from the integrated graphics and video processor 110 into appropriate video signals. In one embodiment, the video encoder 132 provides input to a TV set and the video encoder 134 provides input to a video cassette recorder (VCR). As is known by one skilled in the art, other video equipment can be used.

The memory 140 stores code, data, and other information for use by the integrated graphics and video processor 110 and other devices. In one embodiment, the memory 140 includes a number of synchronous dynamic random access memory (SDRAM) devices.

The CPU 150 is a processor that performs general processing functions. In one embodiment, the integrated graphics and video processor 110 is designed to interface with a number of types of microprocessors. In one embodiment, these microprocessors include the Motorola MC6833x, the Motorola MC68340/L64x08, the ST20-TPI/ST20-T, the Motorola MCF5206, the Hitachi SH-2/3, and the DEC StrongARM SA-110. As is known by one skilled in the art, other microprocessors can be used including digital signal processors (DSP), reduced instruction set computers (RISCs), or even special-purpose processors.

The communication interface 160 provides interface to communication devices or media to the CPU 150. The communication interface 160 may include telephone modem interface, network interface, radio transceivers, fiber optics transceivers, etc. The network medium 170 provides a communication medium for information transmission and reception. In one embodiment, the network medium 170 is the Internet.

Figure 2:
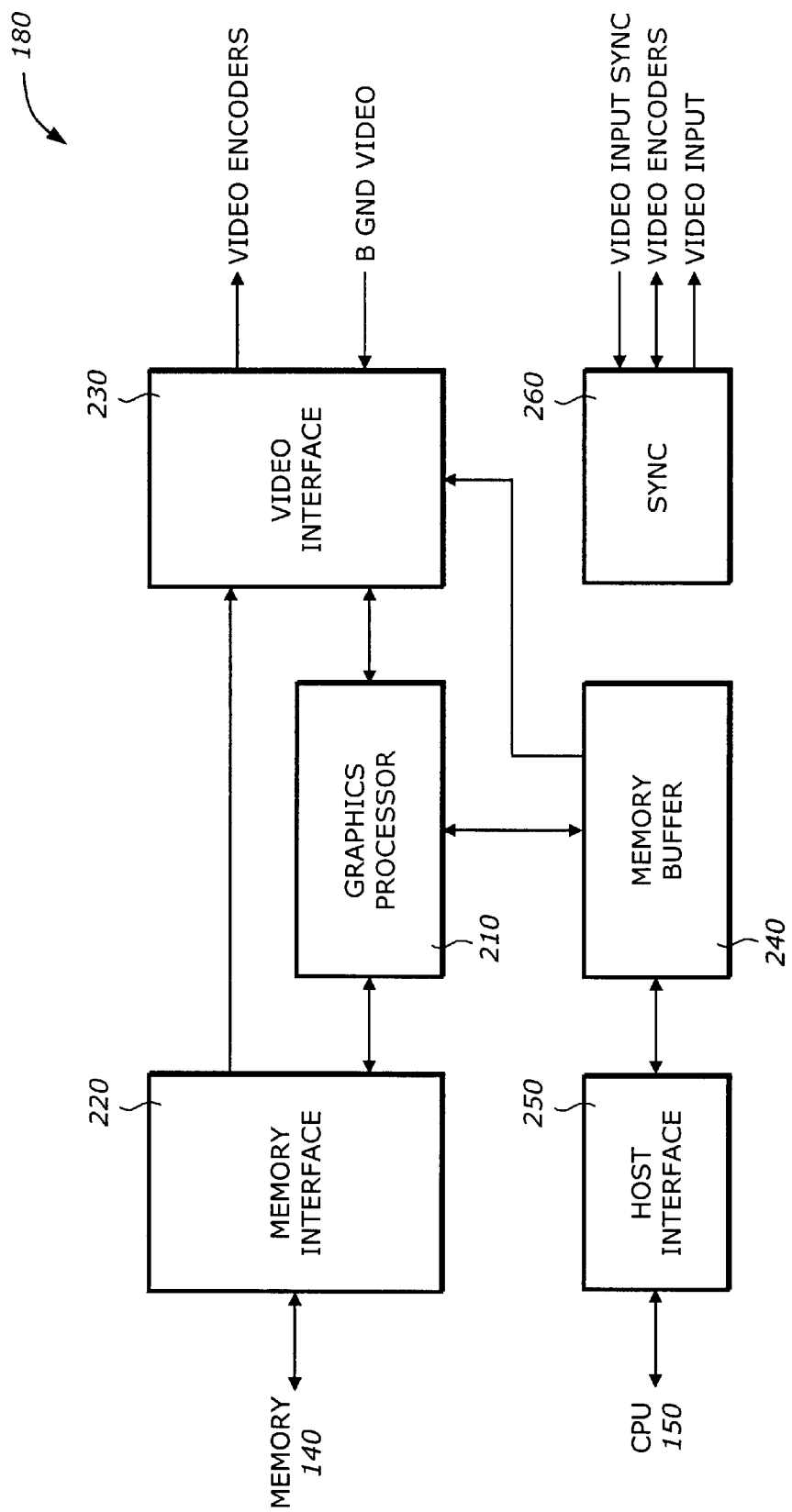
FIG. 2 is a diagram illustrating an integrated video and graphics processor according to one embodiment of the invention.

FIG. 2 is a diagram illustrating a display processor 180 shown in FIG. 1 according to one embodiment of the invention. The display processor 180 includes a graphics processor 210, a memory interface 220, a video interface 230, a memory buffer 240, a host interface 250, and a synchronization (SYNC) circuit 260.

The graphics processor 210 receives the graphic/video data from the memory 140 via the memory interface 220 and the memory buffer 240 and generates the result to the video encoders via the video interface 230. The graphics processor 210 performs a comprehensive set of functions on two-dimensional pixel data in a variety of pixel map formats. These functions include horizontal and vertical scaling and filtering, aspect ratio correction, and anti-flickering.

The memory interface 220 interfaces to the memory 140 (FIG. 1) to provide data to the graphics processor 210 and the video interface 230. The memory interface 220 includes circuits to allow access to the memory 140 at high bandwidth to accommodate the processing speed of the graphics processor 210.

The video interface 230 performs the final blending and compositing operations of the input sources of the display processor 180. The video interface 230 also generates proper video timing signals to video encoders such as CCIR-601 synchronization, vertical and horizontal synchronization signals. The video interface 230 generates display data to the video encoders and receives background (BGND) video from other video sources.

The memory buffer 240 stores temporary data in properly sized buffers for use by the CPU 150 and the graphics processor 210. The memory buffer 240 manages the buffer needs of the background graphics, scaled video, scaled graphics, cursor and configuration registers. In one embodiment, these buffers are implemented by fast static random access memory (SRAM).

The host interface 250 provides interface to the CPU 150. The host interface 250 generates interrupt signals to the CPU 150 for end of scan line, beginning of field, or end of field. The host interface 250 also allows the CPU 150 to configure and initialize the display processor 180 via a set of configuration and control registers.

The SYNC unit 260 provides horizontal (H), vertical (V), and field (F) information to be used in video synchronization. The H, V, and F information can be generated in a programmable manner so that a number of video formats can be accommodated. Examples of these video formats include CCIR-601, NTSC, PAL.

Figure 3A:
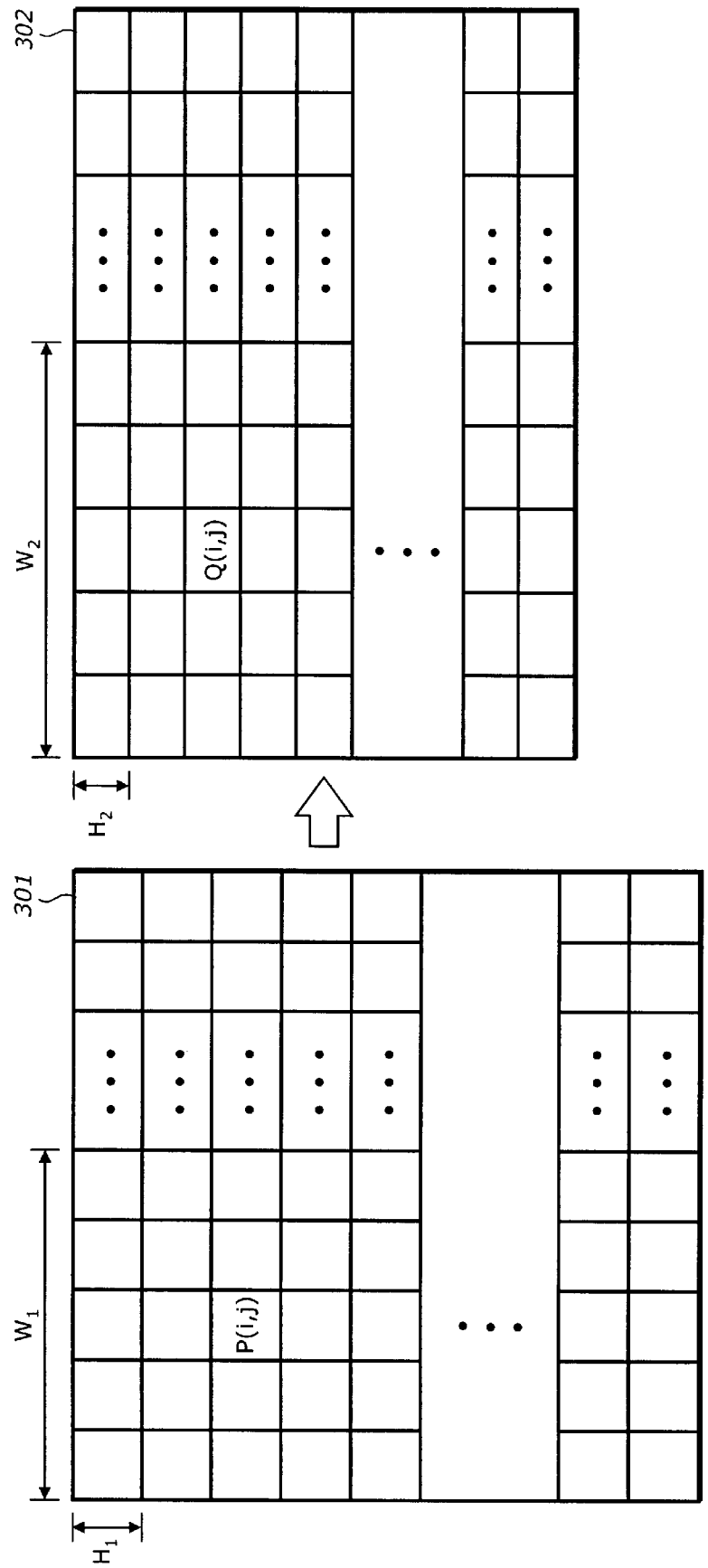
FIG. 3A is a diagram illustrating a display mapping for aspect ratio correction according to one embodiment of the invention.

Aspect Ratio Correction:

FIG. 3A is a diagram illustrating a display mapping for aspect ratio correction according to one embodiment of the invention. The mapping involves a source display 301 and a destination display 302.

The aspect ratio is the ratio between the width and the height of the pixel as displayed on the monitor screen. The aspect ratio in the source display can be corrected to match that of the destination display 302 by performing appropriate filtering operations.

The source and destination displays 301 and 302 have horizontal and vertical arrays of pixels, corresponding to row and column of data, respectively. The source display 301 includes a pixel P(i,j) located at row i and column j. The destination display includes a pixel Q(i,j) at row i and column j. The heights of the pixels in the source and destination displays 301 and 302 are H1 and H2, respectively. The widths of the pixels in the source and destination displays 301 and 302 can be related to the width of a group of pixels in both displays. In the illustrative example of FIG. 3A, the widths of a group of 5 pixels in the source and destination displays 301 and 302 are W1 and W2, respectively. Without loss of generality, the aspect ratio can also be defined as a ratio between the width of a group of pixels and the height of a pixel.

The aspect ratio of the source display 301 is $\alpha 1 = W1/H1$. The aspect ratio of the destination display 302 is $\alpha 2 = W2/H2$. Correcting the aspect ratio of the source display 301 is to make its aspect ratio to be the same as the destination aspect ratio, i.e., $\alpha 1 = W1/H1 = \alpha 2 = W2/H2$. This expression leads to:

$$W1/W2 = H1/H2 = sf$$

where sf is a scale factor.

Correcting the aspect ratio of the source display 301 to match the destination display 302 is, therefore, equivalent to performing a horizontal scaling and a vertical scaling on row and column of pixels of the source display 301, using the scale factor sf.

The scaling can be up or down. A scale factor of less than 1.0 corresponds to a scale up operation. A scale factor of greater than 1.0 corresponds to a scale down operation. Scaling, whether up or down, essentially involves the calculation of the values of the pixels that correspond to scaled positions as determined from a given scale factor his calculation is conveniently carried out by a filtering operation. A digital filter can perform filtering operation to provide interpolation and decimation for scaling.

In one embodiment, horizontal scaling and vertical scaling is controlled by independent digital differential analyzers (DDA). The user programs the DDA depending on the desired scale factor. The scaler performs a variable tap filter operation. The taps are weighted according to the sample position, the filter length, and the sub-pixel positioning of the filter window. The filter coefficients are synthesized and determined in advance before the filtering takes place in real-time. For field-based video, the vertical filtering is performed on each field separately.

The display processor 180 shown in FIG. 2 has circuits perform horizontal and vertical filtering for aspect ratio correction. The pixel data are fetched from the memory 140 via the memory interface 220 at a fast rate to accommodate the display bandwidth requirement. To provide increased or potentially maximum utilization of memory devices, the memory interface 220 has a circuit to support an access pattern for the SDRAM in the memory 140. This efficient access pattern will be described later.

Figure 3B:
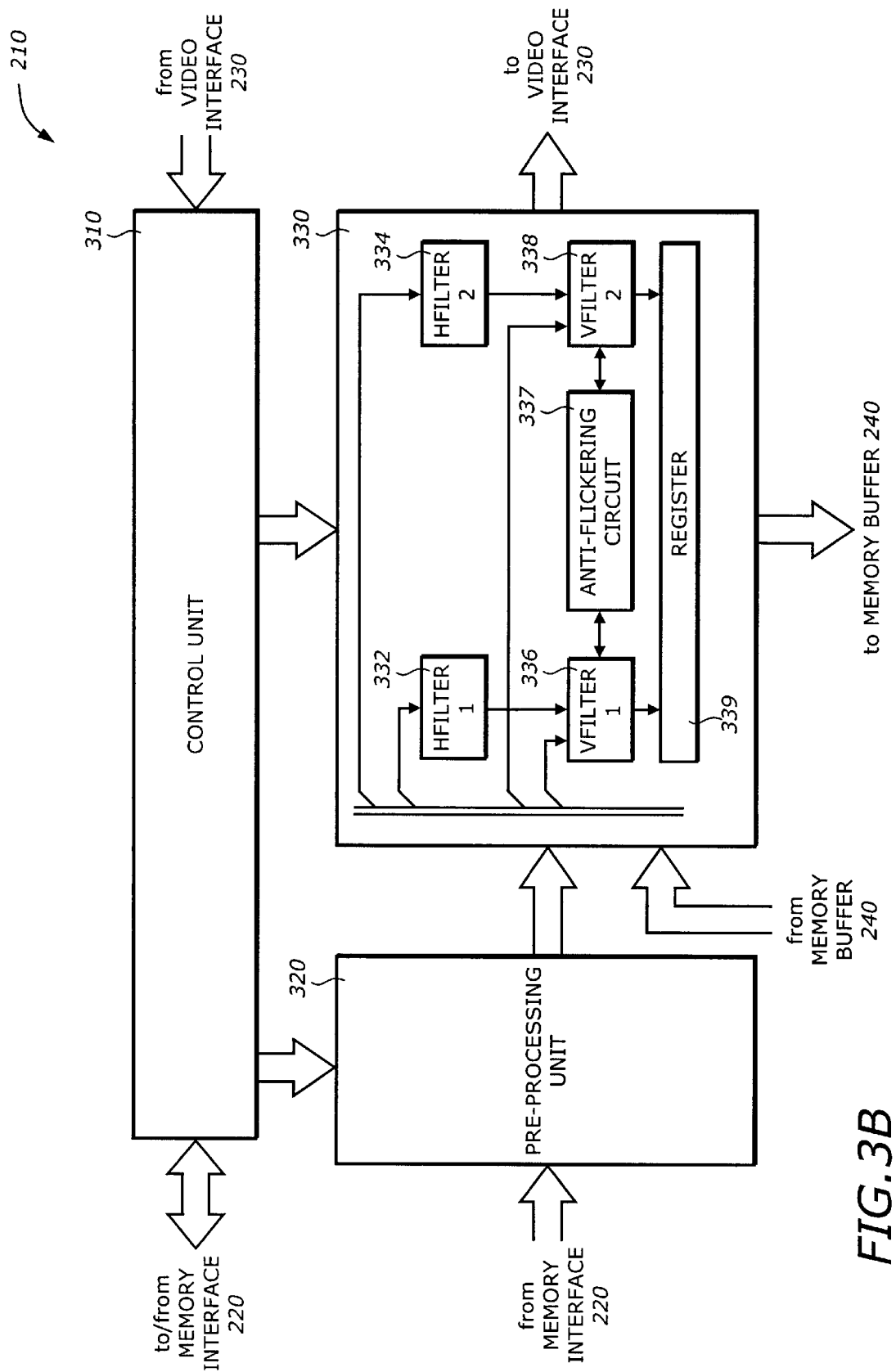
FIG. 3B is a diagram illustrating a graphics processor according to one embodiment of the invention.

FIG. 3B is a diagram illustrating a graphics processor 210 shown in FIG. 2 according to one embodiment of the invention. The graphics processor 210 performs the necessary filtering operations for the aspect ratio correction and other scaling and filtering needs. The graphics processor 210 includes a control unit 310, a pre-processing unit 320 and a filtering unit 330.

The control unit 310 generates control signals to the pre-processing unit 320 and the filtering unit 330. These control signals may include multiplexer select signals, data steering signals, etc. The control unit 310 generates and receives signals to and from the memory interface 220 to control the fetching of pixel data from the memory 140. The control unit 310 also receives signals from the video interface 230 such as timing and synchronization signals. The control unit 310 uses these timing and synchronization signal to coordinate and schedule activities within the graphics processor 210.

The pre-processing unit 320 preprocesses the graphic data before sending it to the filtering unit 330. Examples of the pre-processing operations include pixel expansion, color keying, and RGB-to-YCbCr conversion. It is contemplated that these operations can be bypassed and the graphic data can be sent directly to the filtering unit 330.

The filtering unit 330 performs horizontal and vertical scaling and filtering on the graphical data. The filtering unit 330 includes horizontal filters 332 (HFILTER1) and 334 (HFILTER2), vertical filters 336 (VFILTER1) and 338 (VFILTER2), and register 339. The HFILTER1 332 and HFILTER2 334 perform horizontal scaling and filtering on rows of pixels in a pipeline and parallel fashion. In one embodiment, the HFILTER1 332 and HFILTER2 334 operate on the alpha and luma (Y) components of the video data. The two filters have identical architecture and operate together to increase the throughput to accommodate the bandwidth of the video signals. Among other things, the horizontal scaling corrects the aspect ratio to fit within the display region as programmed by the user. The VFILTER1 336 and VFILTER 338 perform vertical scaling on columns of pixels in a pipeline and parallel fashion. In one embodiment, the VFILTER1 336 and VFILTER2 338 perform vertical scaling and filtering on the alpha, luma (Y), and the chroma (Cb, Cr) components as well as horizontal scaling and filtering on the chroma components. The two filters have identical architecture and operate together to increase the throughput to accommodate the bandwidth of the video signals. Among other things, the VFILTER1 336 and VFILTER2 338 perform vertical filtering for anti-flickering operations.

The anti-flickering circuit 337 operates in conjunction with the VFILTER1 336 and VFILTER2 338 to generate anti-flickered pixels from the stream of pixel data. In one embodiment, the anti-flickering circuit 337 is part of the vertical filters 336 and 338. The register 339 stores the resulting filtered outputs to be transferred to the video interface 230.

Figure 4:
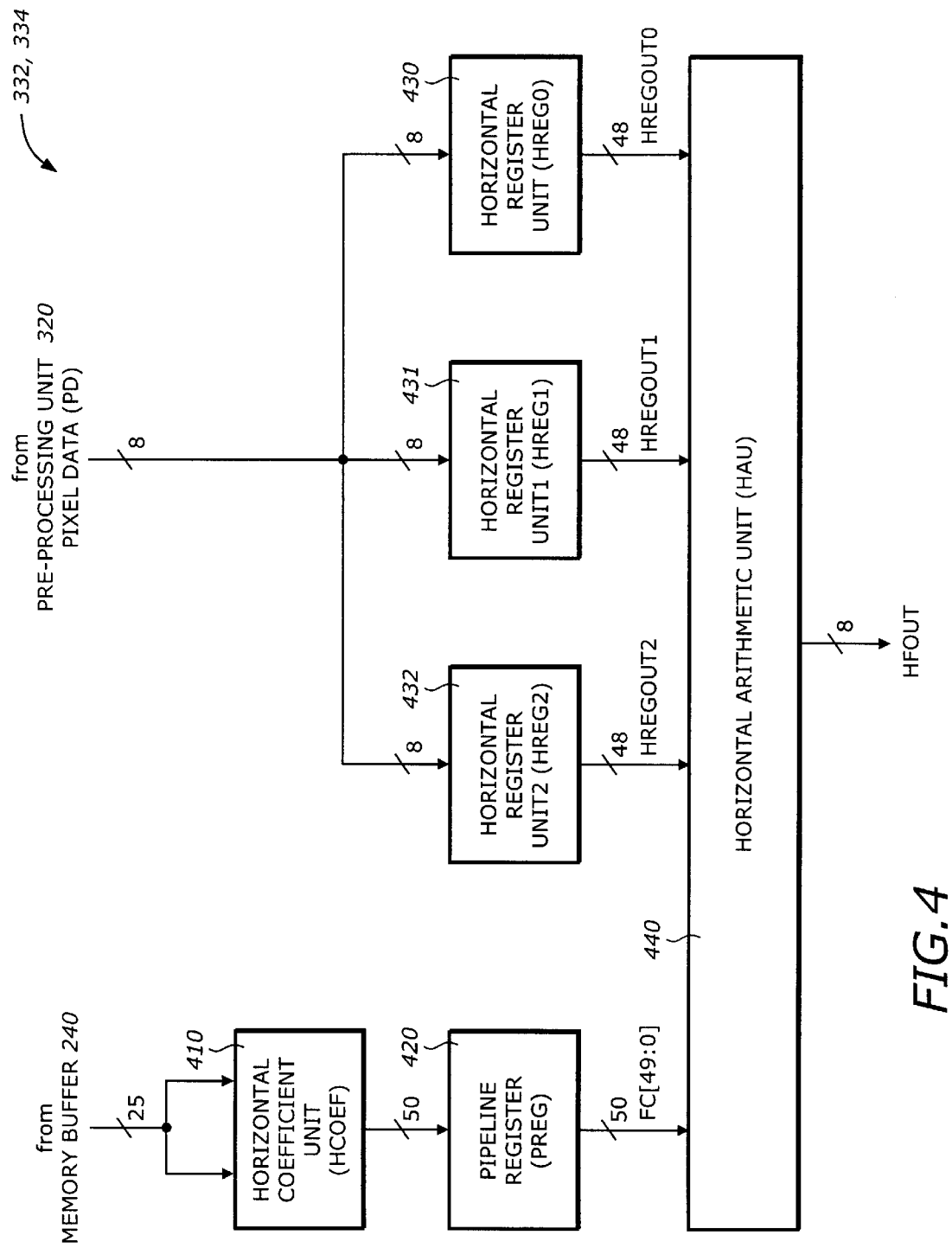
FIG. 4 is a diagram illustrating a horizontal filter according to one embodiment of the invention.

FIG. 4 is a diagram illustrating a horizontal filter 332/334 shown in FIG. 3 according to one embodiment of the invention. The horizontal filter 332/334 includes a horizontal coefficient unit (HCOEF) 410, a horizontal pipeline register (PREG) 420, horizontal register units (HREG0, HREG1, and HREG2) 430, 431, and 432, and horizontal arithmetic unit (HAU) 440.

The HCOEF 41 receives the coefficients for the horizontal filters from the memory buffer 240 (FIG. 2). These filter coefficients are values that have been determined to achieve the desired filtering effects. The horizontal filter 332/334 is essentially a digital non-recursive filter. The basic filtering equation is:

$$hfout[k] = \Sigma fc[j] * pd[j], j=1, \ldots, N \quad (1)$$

where fc[j] is the filter coefficient j and pd[j] is the corresponding pixel data, hfout[k] is the result horizontal filtered output, and N is the number of taps in the filter.

In the exemplary embodiment of the horizontal filter shown in FIG. 4, N is 6. The filter coefficients are fc[0], fc[1], fc[2], fc[3], fc[4], and fc[5] having word sizes of 8, 8, 9, 9, 8 and 8, respectively. The filter coefficients are loaded in groups of 3 in two clock cycles. In the first clock cycle, fc[0], fc[1], and fc[2] are loaded. In the second clock cycle, fc[31], fc[4] and fc[5] are loaded. The total number of bits to be loaded therefore is 8+8+9=25, resulting in a total length of 50 bits for the entire six coefficients. After the coefficients are loaded into the HCOEF 410, they are transferred to the PREG 420 for use by the HAU 440. The PREG 420 is used to provide a pipeline stage to allow the loading of the coefficients to be done one set ahead of the actual filtering process.

The HREG0 430, HREG1 431, and HREG2 432 receive the pixel data PD from the pre-processing unit 320 (FIG. 3). The PD is serially shifted into each of the HREG0 430, HREG1 431, and HREG2 432. The HREG0 430, HREG1 431, and HREG2 432 store eight pixel data from three consecutive horizontal lines, six of which are used in the filtering operation. The remaining two pixel data are used to ensure continuous data flow during the serial shift. The HREG0, HREG1, and HREG2 generate three 8-pixel data corresponding to three 48-bit data HREG0UT0, HREG0UT1, and HREG0UT2, respectively.

The HAU 440 performs the arithmetic calculations for the non-recursive filter. The basic operations performed by HAU 440 include multiply and add (or accumulate). The HAU 440 generates the result horizontal filtered output HFOUT at the clock rate compatible with the video display.

Figure 5:
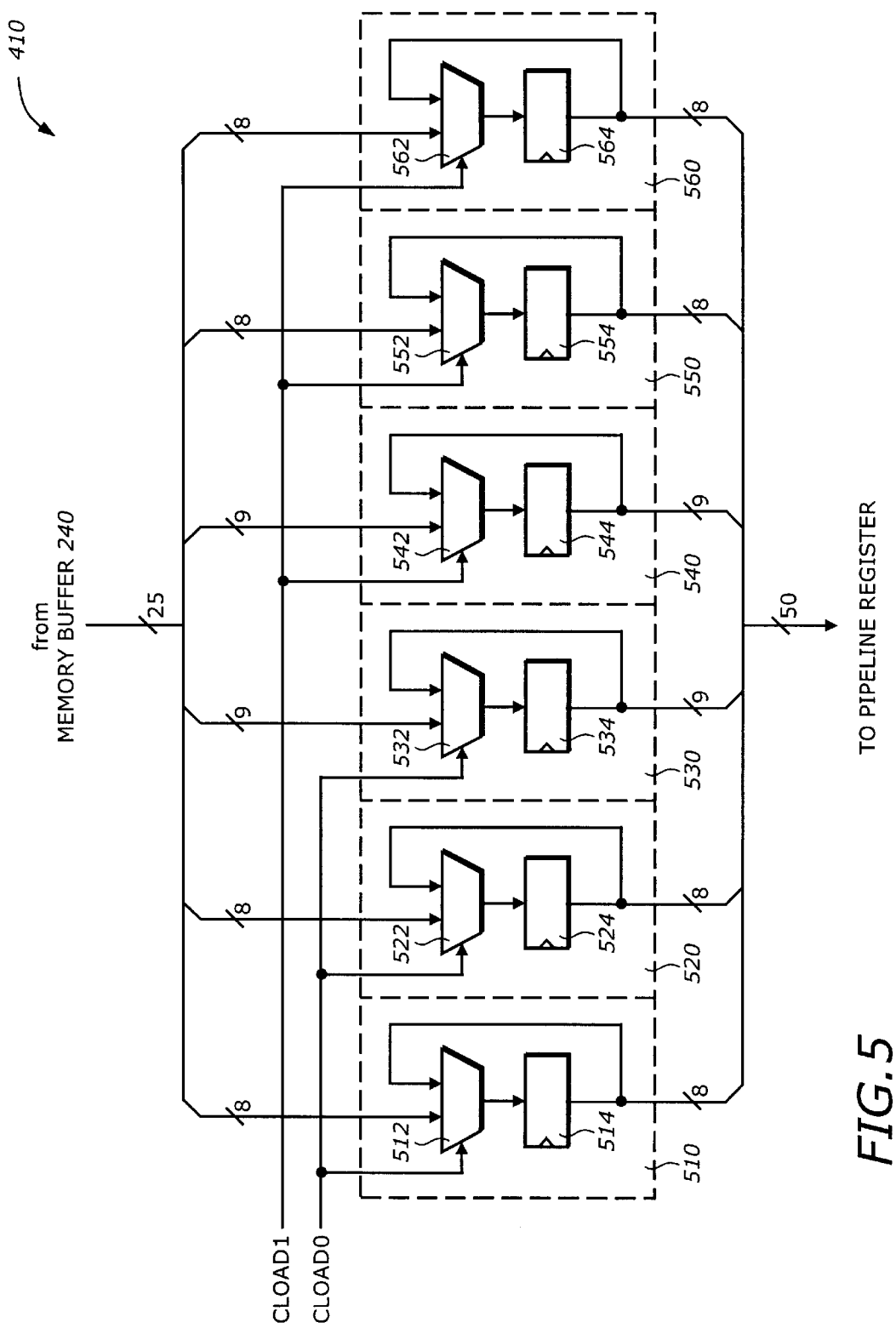
FIG. 5 is a diagram illustrating a coefficient register unit according to one embodiment of the invention.

FIG. 5 is a diagram illustrating a horizontal coefficient unit (HCOEF) 410 according to one embodiment of the invention. The HCOEF 410 includes six data select circuits 510, 520, 530, 540, 550, and 560 to receive the filter coefficients from a coefficient memory in the memory buffer 240 in two clock cycles. The data select circuits 510, 520 and 530 receive the first three coefficients fc[0], fc[1], and fc[2] in the first clock cycle. The data select circuits 530, 540 and 550 receive the second three coefficients fc[3], fc[4], and fc[5] in the second clock cycle.

Each of the data select circuits 510, 520, 530, 540, 550, and 560 includes a multiplexer and a register. The data select circuits 510, 520, 530, 540, 550, and 560 includes multiplexers 512, 522, 532, 542, 552, and 562, respectively, and registers 514, 524, 534, 544, 554, and 564, respectively. One input of each of the multiplexers 512, 522, 532, 542, 552, and 562 is the corresponding filter coefficient of the coefficients fc[0], fc[1], fc[2], fc[31], fc[4], and fc[5]. The output of each registers 514, 524, 534, 544, 554, and 564 is fed back to the other input of the corresponding multiplexer. The data select circuits 510, 520, and 530 are selected by the multiplexer select control signal CLOAD0. The data select circuits 540, 550, and 560 are selected by the multiplexer select control signal CLOAD1. The control signals CLOAD0 and CLOAD1 are provided by the control unit 310.

In the first clock cycle, the coefficients fc[0], fc[1], and fc[2] are presented to the data select circuits 510, 520, 530, 540, 550, and 530. The control signal CLOAD0 is asserted to select the fc[0], fc[1], and fc[2] to load into the registers 514, 524, and 534 of the data select circuits 510, 520, and 530, respectively. The control signal CLOAD1 is de-asserted to select the output of the registers 544, 554, and 564 to load into the registers 544, 554, and 564, respectively, so that the same previous values are retained.

In the second clock cycle, the coefficients fc[3], fc[4], and fc[5] are presented to the data select circuits 510, 520, 530, 540, 550, and 530. The control signal CLOAD1 is asserted to select the fc[3], fc[4], and fc[5] to load into the registers 544, 554, and 564 of the data select circuits 540, 550, and 560, respectively.he control signal CLOAD0 is de-asserted to select the output of the registers 514, 524, and 534 to load into the registers 514, 524, and 534, respectively, so that the same previous values are retained.At the end of the second clock cycle, the entire six coefficients fc[0], fc[1], fc[2], fc[3], fc[4], and fc[5] are loaded into the six registers 510, 520, 530, 540, 550, and 530, respectively. The six coefficients fc[0], fc[1], fc[2], fc[3], fc[4], and fc[5] are then transferred to the PREG 420, ready to be processed by the HAU 440.

Figure 6:
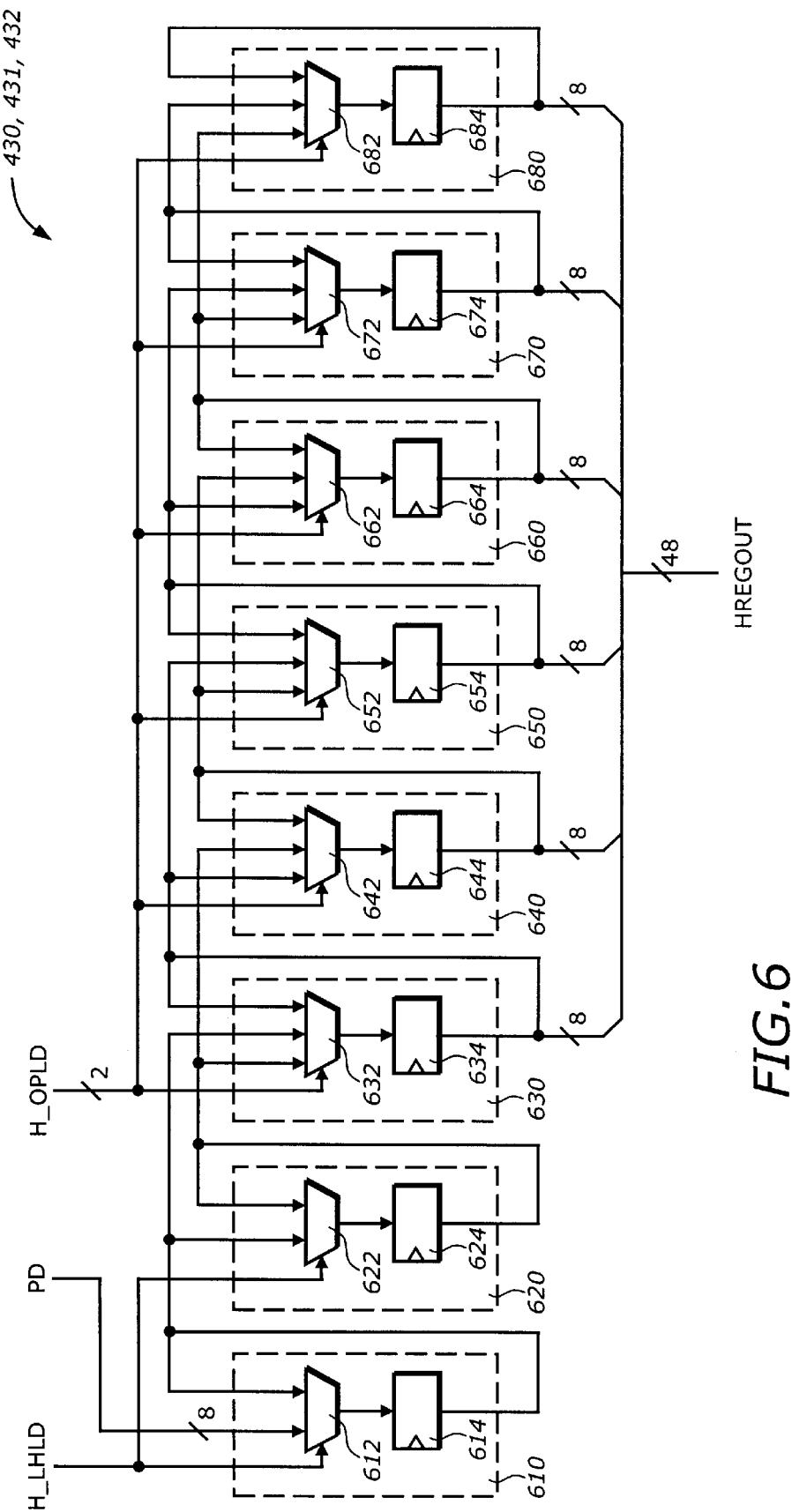
FIG. 6 is a diagram illustrating a horizontal register unit according to one embodiment of the invention.

FIG. 6 is a diagram illustrating a horizontal register unit (HREG) 430/431/432 (shown in FIG. 4) according to one embodiment of the invention. The HREG 430/431/432 includes eight data select circuits 610, 620, 630, 640, 650, 660, 670, and 680 to select and store the pixel data PD as provided by the pre-processing circuit 320 (FIG. 3). The eight data select circuits 610, 620, 630, 640, 650, 660, 670, and 680 form a shift register to serially shift the pixel data horizontally. The six data select circuits 630, 640, 650, 660, 670, and 680 store the six pixel data to be multiplied and accumulated with the filter coefficients loaded in the HCOEF 410 (FIG. 4). The two data select circuits 610 and 620 store the next two pixel data to ensure continuous shifting and data synchronization while the HAU 440 performs the arithmetic operations of the digital filtering.

The data select circuits 610, 620, 630, 640, 650, 660, 670, and 680 include multiplexers 612, 622, 632, 642, 652, 662, 672, and 682, respectively, and registers 614, 624, 634, 644, 654, 664, 674, and 684, respectively. All the data select circuits 610, 620, 630, 640, 650, 660, 670, and 680 have the feedback connection to allow parallel load of previous data in the corresponding registers. The multiplexers 612 and 622 are two-input multiplexers controlled by the control signal H_LHLD. The multiplexers 632, 642,.652, 662, 672, and 682 are three-input multiplexers controlled by the control signal H_OPLD.

The data select circuits 610, 620, 630, 640, 650, 660, 670, and 680 are connected to allow three modes of operation: one-bit shift, two-bit shift, and parallel load, according to the control signal H_OPLD. To illustrate this, suppose initially the registers 614, 624, 634, 644, 654, 664, 674, and 684 store the data p1, p2, p3, p4, p5, p6, p7, and p8, respectively. In the next clock cycle, the contents of the registers are loaded with the following data according to the control signal H_OPLD as follows:

| H OPLD | 634 | 644 | 654 | 664 | 674 | 684 |
|---|---|---|---|---|---|---|
| Parallel load | p3 | p4 | p5 | p6 | p7 | p8 |
| One-pixel shift | p2 | p3 | p4 | p5 | p6 | p7 |
| Two-pixel shift | p1 | p2 | p3 | p4 | p5 | p6 |

This multi-bit shifting provides flexibility in generating the proper pixel data for filtering.

Figure 7:
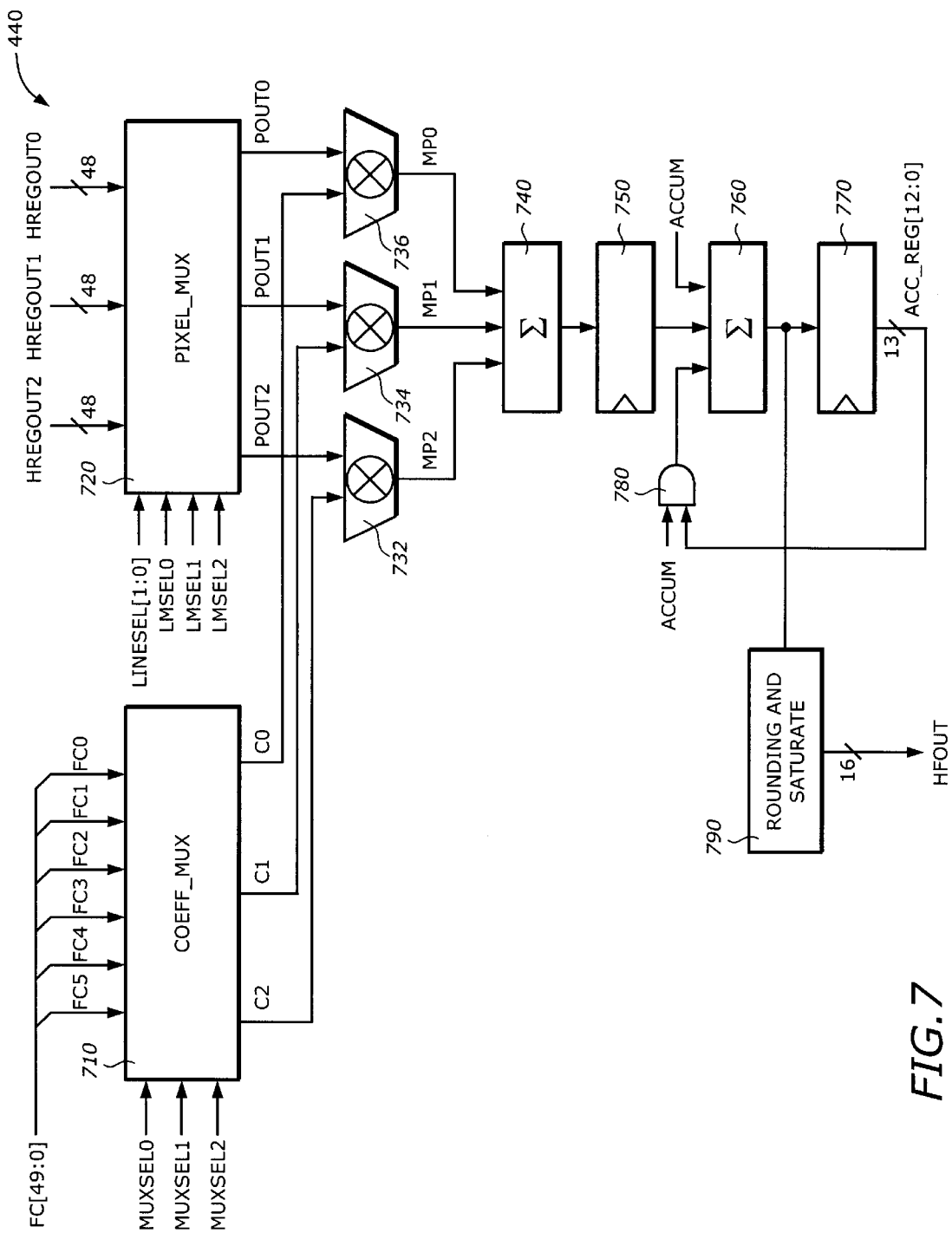
FIG. 7 is a diagram illustrating a horizontal arithmetic unit according to one embodiment of the invention.

FIG. 7 is a diagram illustrating a horizontal arithmetic unit (HAU) 440 according to one embodiment of the invention. The HAU 440 includes a coefficient multiplexer (COEFF_MUX) 710, a pixel multiplexer (PIXEL_MUX) 720, multipliers 732, 734, and 736, a first adder 740, a first register 750, a second adder 760, a second register 770, an AND circuit 780, and a rounding and saturate circuit 790.

The COEFF_MUX 710 selects the six filter coefficients FC0, FC1, FC2, FC3, FC4, and FC5 from the PREG 420 (FIG. 4) and generates three filter coefficients C0, C1, and C2 at a time. The PIXEL_MUX 720 receives three 48-bit HREG0UT0, HREG0UT1, and HREG0UT2 from the HREG0 430, HREG1 431, and HREG2 432, respectively (FIG. 4), and generates three pixel data POUT0, POUT1, and POUT2 at a time. The sets of outputs from the COEF MUX 710 and the PIXEL MUX 720 are paired to inputs of the three multipliers 732, 734, and 736. The COEFF_MUX 710 is controlled by the control signals MUXSEL0, MUXSEL1, and MUXSEL2. The PIXEL_MUX 720 is controlled by the control signals LINESEL[1:0], LMSEL0, LMSEL1, and LMSEL2. These control signals are provided by the control unit 310 such that the pixel data are selected to correspond to the appropriate filter coefficients.

The multiply and accumulate operation of the digital filter is performed in a pipeline manner. The first adder 740 adds the three products MP0, MP1, and MP2 to form the first half of the sum in the digital filter equation (1). The first sum is then loaded into the first register 750 in a pipeline manner. The second adder 760 then adds the first sum to zero. In the next clock cycle, the first sum is transferred to the second register 770 and the second sum is loaded into the first register 740. The three multipliers 732, 734, and 735 multiply the next set of pixel data with the corresponding filter coefficients, and the second adder 740 adds the second three products MP0, MP1, and MP2 to form the second half of the sum in the digital filter equation (2), and the second sum as loaded into the first register 740.

Then the ACCUM signal is asserted to gate the first sum in the second register 770 back to one input of the second adder 760 via the AND gating circuit 780. The ACCUM signal also provides the rounding bit to the second adder 760. The second adder 760 then adds the second sum in the first register 750 to the first sum as gated by the AND gating circuit 780 and the rounding bit ACCUM to produce the final sum. The rounding and saturate circuit 790 then rounds the final sum and applies a saturating logic to generate the filter output result HFOUT.

Figure 8:
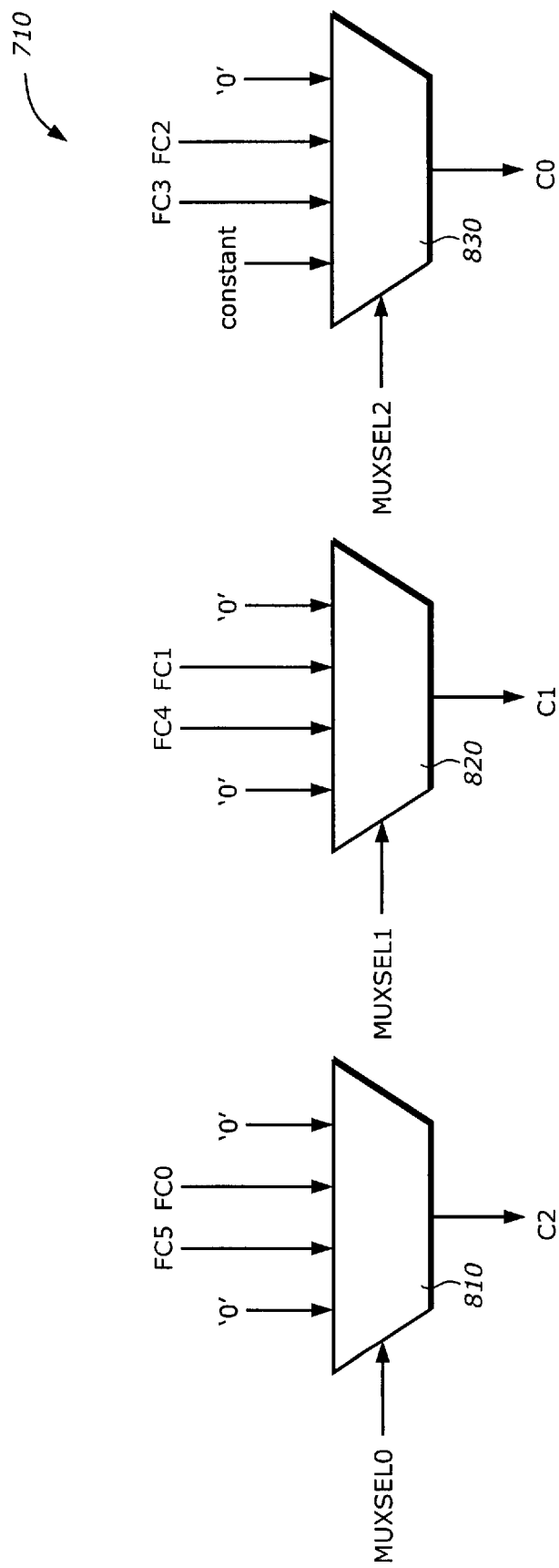
FIG. 8 is a diagram illustrating a coefficient multiplexer according to one embodiment of the invention.

FIG. 8 is a diagram illustrating a coefficient multiplexer (COEFF_MUX) 710 according to one embodiment of the invention. The COEFF_MUX 710 includes three four-input multiplexers 810, 820, and 830.

The multiplexer 810 selects four inputs 0, 0, FC0, and FC5 under the control of the select control signal MUX-SEL0. The multiplexer 820 selects four inputs 0, 0, FC1, and FC4 under the control of the select control signal MUX-SEL1. The multiplexer 830 selects four inputs 0, constant, FC3, and FC2 under the control of the select control signal MUXSEL2. The multiplexers 810, 820, and 830 generate the filter coefficients C2, C1, and C0, respectively. The six filter coefficients are therefore generated in two clock cycles.

Figure 9:
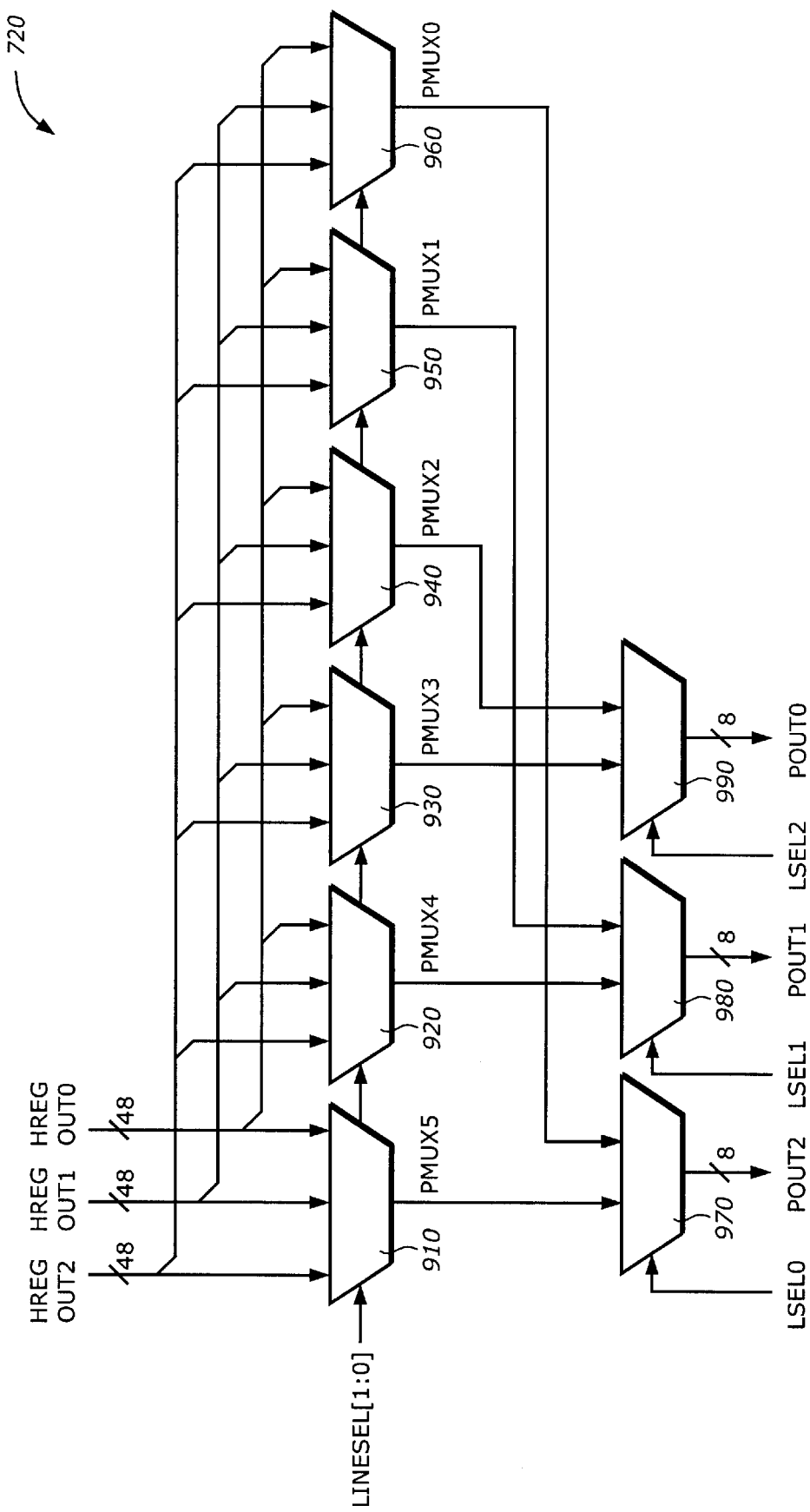
FIG. 9 is a diagram illustrating a pixel multiplexer according to one embodiment of the invention.

FIG. 9 is a diagram illustrating a pixel multiplexer (PIXEL_MUX) 720 (shown in FIG. 7) according to one embodiment of the invention. The PIXEL_MUX 720 includes six three-input multiplexers 910, 920, 930, 940, 950, and 960, and three two-input multiplexers 970, 980, and 990.

The six multiplexers 910, 920, 930, 940, 950, and 960 select the pixel data from three consecutive lines. The 48-bit pixel data from each of the HREG0UT0, HREG0UT1, and HREG0UT2 are split into six 8-bit data to each input of the three-input multiplexers 910, 920,930, 940,950, and 960. The multiplexers 910, 920, 930, 940, 950, and 960 are controlled by the control signal LINESEL[1:0]. The multiplexers 910, 920, 930, 940, 950, and 960 generates six pixel data PMUX5, PMUX4, PMUX3, PMUX2, PMUX1, and PMUX0, respectively.

Each of the three two-input multiplexers 970, 980, and 990 selects a pair of pixel data to correspond with the filter coefficients as selected by the COEFF_MUX 710 (FIG. 8). The multiplexer 990 selects the pair PMUX3 and PMUX2 to correspond to the multiplexer 830 in the COEFF_MUX 710. The multiplexer 980 selects the pair PMUX4 and PMUX1 to correspond to the multiplexer 820 in the COEFF_MUX 710. The multiplexer 970 selects the pair PMUX5 and PMUX0 to correspond to the multiplexer 810 in the COEFF_MUX 710. The multiplexers 970, 980, and 990 are controlled by the select control signals LSEL0, LSEL1, and LSEL2, respectively. The outputs of the multiplexers 970, 980, and 990 are POUT2, POUT1, and POUT0, respectively.

Figure 10:
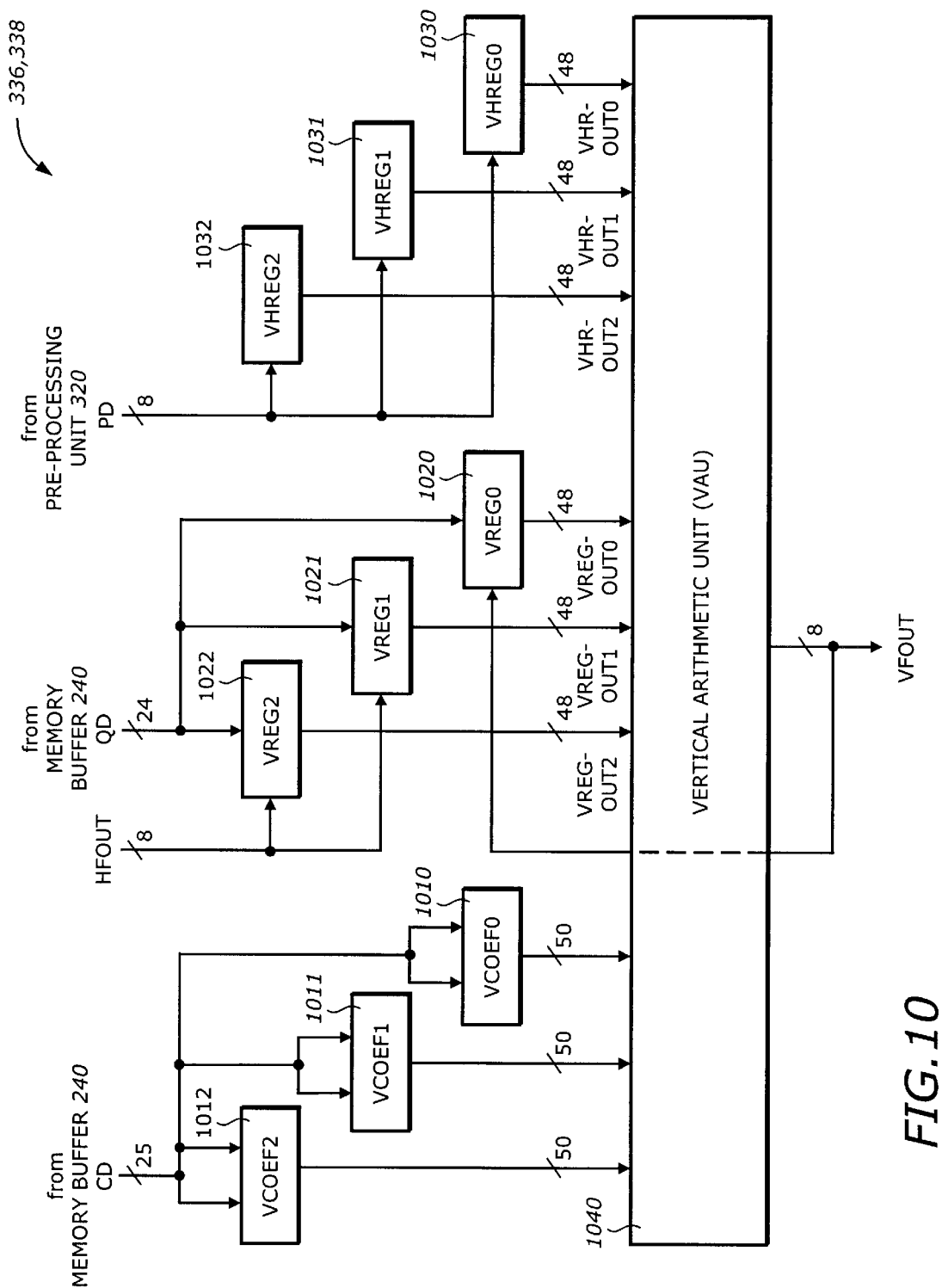
FIG. 10 is a diagram illustrating a vertical filter according to one embodiment of the invention.

FIG. 10 is a diagram illustrating a vertical filter 336/338 (shown in FIG. 3) according to one embodiment of the invention. The vertical filter 336/338 includes three vertical coefficient registers (VCOEF0, VCOEF1, and VCOEF2) 1010, 1011, and 1012, three vertical registers (VREG0, VREG1, and VREG2) 1020, 1021, and 1022, three horizontal registers (VHREG0, VHREG1, and VHREG2) 1030, 1031, and 1032, and a vertical arithmetic unit (VAU) 1040.

Each of the VCOEF0 1010, VCOEF1 1011, and VCOEF2 1012 receives the filter coefficients from the coefficient memory in the memory buffer 240 (FIG. 2) in the same manner as the HCOEF 410 (FIG. 4). Six coefficient data are loaded into the VCOEF0 1010, VCOEF1 1011, and VCOEF2 1012 in two clock cycles, each loading 25-bit data to form 50-bit coefficient data to the VAU 1040.

Each of the VREG0 1020, VREG1 10221, and VREG2 1022 receives the horizontal filter output HFOUT and the vertical pixel data QD from the memory buffer 240. The VREG0 1020, VREG1 10221, and VREG2 1022 parallel load the QD data and serially load the HFOUT to form three 48-bit vertical pixel data VREG0UT0, VREG0UT1, and VREG0UT2, respectively, to the VAU 1040. In one embodiment, the VREG0 1020 serially load the output of the VAU 1040 (VFOUT).

The VHREG0 1030, VHREG1 1031, and VHREG2 1032 receives the horizontal pixel data PD from the pre-processing unit 320 (FIG. 3) in a similar manner as the horizontal registers HREG0 430, HREG1 431, and HREG2 432 in the horizontal filter 332/334 (FIG. 4). The VHREG0 1030, VHREG1 1031, and VHREG2 1032 generate three 48-bit horizontal pixel data VHROUT0, VHROUT1, and VHROUT2, respectively, to the VAU 1040.

The VAU 1040 performs vertical scaling and filtering on the vertical pixel data VREG0UT0, VREG0UT1, and VREG0UT2 using the filter coefficients from the VCOEF0 1010, VCOEF1 1011, and VCOEF2 1012. In addition, the VAU 1040 also performs horizontal scaling and filtering on the horizontal pixel data VHROUT0, VHROUT1, and VHROUT2 using the appropriate coefficients from the VCOEF0 1010, VCOEF1 1011, and VCOEF2 1012. The VAU 1040 generates the vertical filtered output VFOUT.

The architecture of the VAU essentially is similar to the HAU 440 with the exception that there are more data paths to accommodate both the VREG and the VHREG data.

Figure 11:
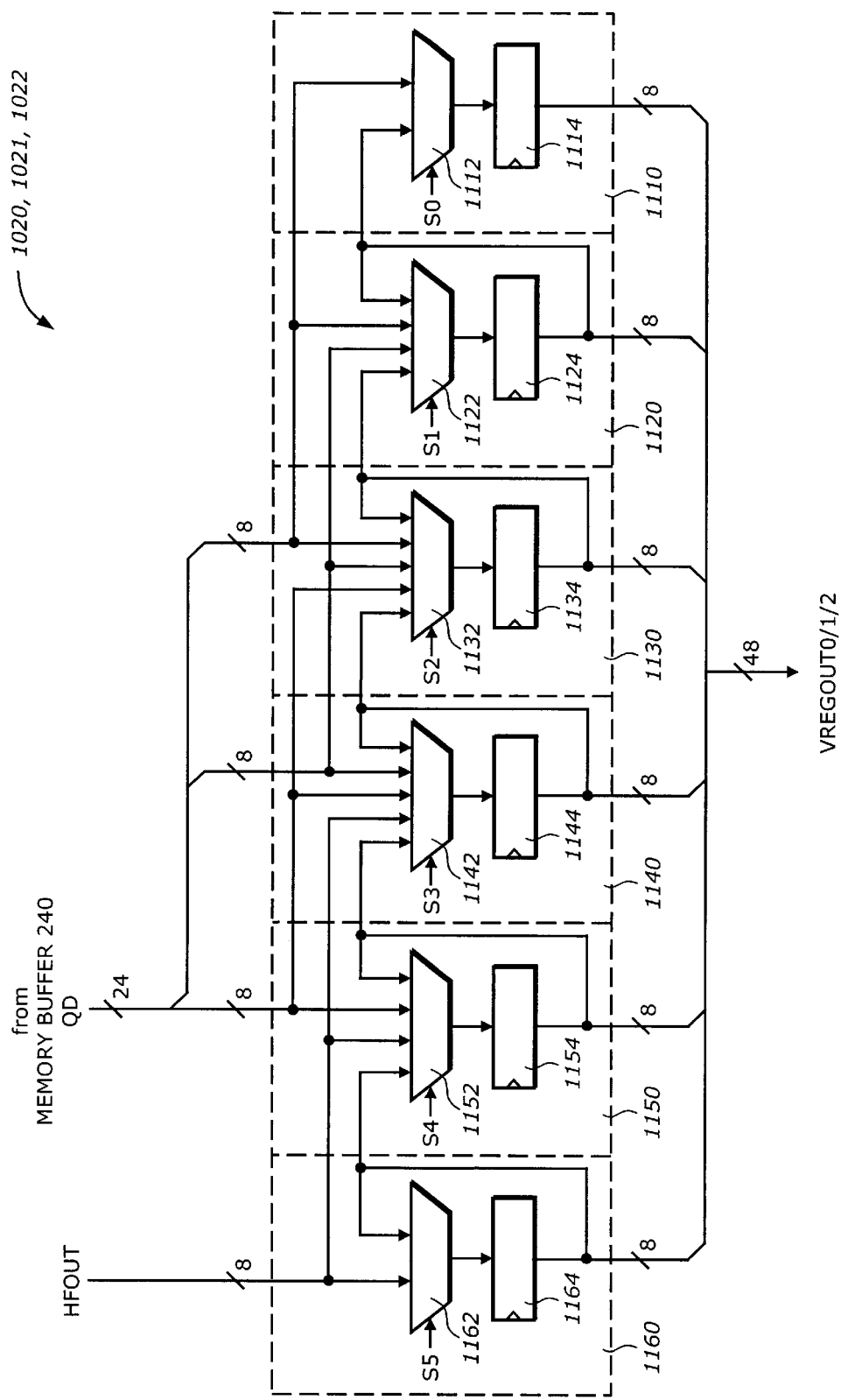
FIG. 11 is a diagram illustrating a vertical register unit according to one embodiment of the invention.

FIG. 11 is a diagram illustrating a vertical register 1020/1021/1022 (shown in FIG. 10) according to one embodiment of the invention. The vertical register 1020/1021/1022 includes six data select circuits 1110, 1120, 1130, 1140, 1150, and 1160.

The data select circuits 1110, 1120, 1130, 1140, 1150, and 1160 include multiplexers 1112, 1122, 1132, 1142, 1152, and 1162, respectively, and registers 1114, 1124, 1134, 1144, 1154, and 1164, respectively. The data select circuits 1160, 1150, and 1140 receive the filtered output of the horizontal filter HFOUT. The data select circuits 1110, 1120, 1130, 1140, and 1150 receive the pixel data from the memory buffer 240 which correspond to the vertical pixel arrays.

The data select circuits 1110, 1120, 1130, 1140, 1150, and 1160 are connected to provide a flexible shifting scheme that can accommodate variable taps for the vertical filtering. In one embodiment, the vertical taps range from one to six.

Anti-flickering:

The anti-flickering reduces the flickering effect caused by the inadequate scanning frequency of the display monitor or the interlacing of the fields in field-based video. The anti-flickering can be applied to either horizontal lines or vertical lines or both. Vertical anti-flickering is more effective to reduce the flickering caused by interlaced video.

Essentially, the anti-flickering operation involves a vertical filtering on a sequence of pixel data stored in a register unit. The sequence of data is fetched serially in a stream at a rate compatible with the display rate. The vertical filter generates a filtered pixel corresponding to a source pixel at each position of the filter. The source pixel is selected from two pixels at the center of the filter window. The selection is based on whether which pixel has a value higher than a phase value determined in advance. This phase value may also be related to the field of the video. After the source pixel is selected, it is compared with a threshold. The threshold value is programmable by the user and is stored in a threshold register. It is also contemplated that the threshold value may be made adaptively variable according to other factors such as filter length, pixel location on the image, neighborhood average intensity, etc.

The comparator compares the source pixel value with the threshold value and generates a comparison result. If the source pixel value is greater than the threshold value then the filtered output corresponding to that source pixel is used as the anti-flickered pixel and output to the display unit. If the source pixel value is less than or equal to the threshold value, then the source pixel is selected to be output to the display unit.

Figure 12:
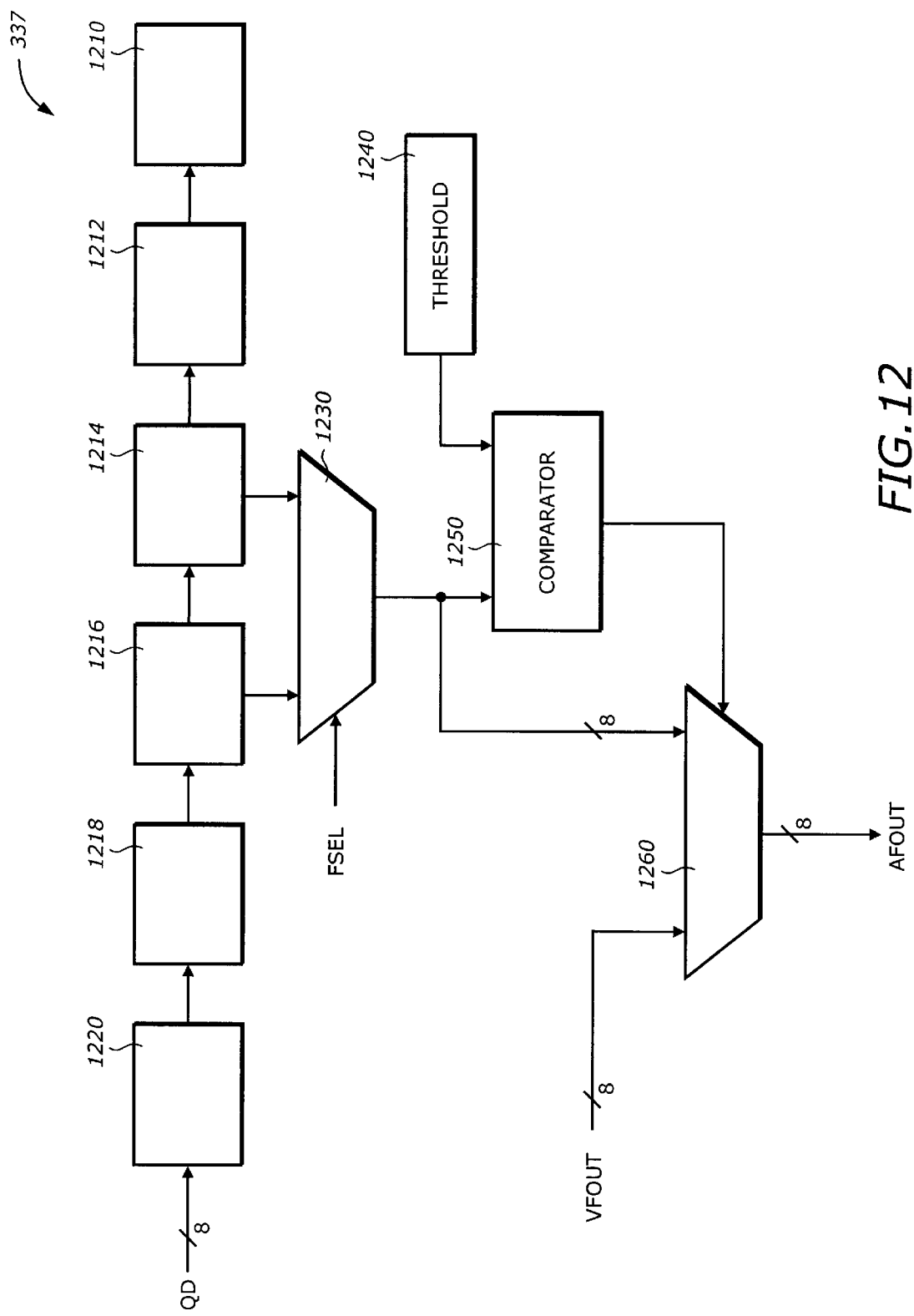
FIG. 12 is a diagram illustrating an anti-flickering circuit according to one embodiment of the invention.

FIG. 12 is a diagram illustrating an anti-flickering circuit 337 (shown in FIG. 3) according to one embodiment of the invention. The anti-flickering circuit 337 includes six registers 1210, 1212, 1214, 1216, 1218, and 1220, a first multiplexer 1230, a threshold register 1240, a comparator 1250, and a second multiplexer 1260.

The six registers 1210, 1212, 1214, 1216, 1218, and 1220 form a serial shifter to shift the vertical pixel data QD. The two registers 1214 and 1216 provide the pixel data for anti-flickering operation. One of the pixel data from these two registers is selected by the first multiplexer 1230. The selection is performed by the control signal FSEL. The control signal FSEL may be a signal representing a comparison between the pixel data in the registers 1214 and 1216 with a phase value. The control signal FSEL may also be a signal representing the field of the interlaced display. Depending on whether the field is odd or even, one of the pixel data stored in the registers 1214 and 1216 is selected.

The selected original vertical pixel data is then compared with a threshold value stored in the threshold register 1240. The threshold register 1240 stores the threshold value as programmed by the host processor CPU 150 (FIG. 1). The comparison is performed by the comparator 1250. The result of the comparator indicates whether the selected original vertical data is less than or greater than the threshold value. If the selected original vertical data is greater than the threshold value, the filtered pixel data is selected as the anti-flickering output (AFOUT); otherwise, the original vertical pixel data is selected as the AFOUT. The output of the comparator 1250 is used as the select control signal for the second multiplexer 1260 for selecting the proper pixel data.

Memory Access Pattern:

The SDRAM is used in the memory 140 to improve the throughput. The SDRAM incorporates a bursting technique in the traditional DRAM data path as is well known in the art. Typically, the SDRAM architecture provides for two or more row addresses of the DRAM to be opened simultaneously. Memory accesses between two opened banks can be interleaved to hide row pre-charge and first access delays. A row address in a given bank should be properly closed before a new access can begin to a different row address in the same bank. Many SDRAM devices incorporate an auto pre-charge technique, which automatically closes the bank at the end of the burst operation. Usually, a different SDRAM command is used to define whether to invoke auto pre-charge, depending on whether a bank is open or closed.

In the SDRAM, a bank activate command is issued before any read or write operation is executed. Once a bank has been activated, it has to be pre-charged before another bank activate command can be applied to the same bank. To be able to use the SDRAM efficiently, therefore, the memory accesses should be interleaved between the two banks. This interleaving scheme works as follows. When bank A is accessed, bank B is prepared for access by being pre-charged and activated. Then, bank B is accessed while bank A is prepared for access by being pre-charged and activated. The process is then continued and the two banks are then flip-flopped for alternating accesses. This interleaving and alternating access sequence results in no loss of accessing time due to delay and therefore achieves the maximum throughput.

The graphic processor 210 accesses the pixel data from the memory 140 via the memory interface 220 (FIGS. 1 and 2). The memory interface 220 has memory control circuit to generate control signals to the SDRAM in the memory 140 to provide proper access sequence. The optimal accessing sequence can be ensured by hardware and/or by software. By arranging groups of pixel data in proper banks, the accessing can achieved the maximum bandwidth utilization provided by the SDRAM.

To provide the interleaving and alternating accesses, a basic unit of group access is defined. This basic unit of group access is determined based on the number of cycles required to perform the precharge and row activate operations. This basic unit corresponds to the number of consecutive words in a memory bank to be accesses in sequence. In the following, the term "group" refers to a group of words in a memory bank that is accessed in the interleaving and alternating sequence. In one embodiment, this group includes eight words of pixel data in the SDRAM.

The filtering unit 330 (FIG. 3) operates on a group of horizontal lines according to the desired filtering operation. The number of horizontal lines to be used in a particular filtering may range from 1 to 6. In other words, during the filtering operation, it is desired that at any time there are up to six lines of pixel data available in the buffer. Since the filtering unit 330 operates in a pipeline fashion, it is not necessary to fetch six lines at one time. After the initial pipeline filling up period during which the first three lines are fetched, subsequent fetches need only to fetch up to three lines of pixel data. In general, if the filtering operation requires H horizontal lines, the number of horizontal lines that needs to be fetched in the pipeline process is equal to S=H/2. In the following discussion, H is taken to be six so that the number of horizontal lines to be fetched in the pipeline process is S=3. The technique in the present invention, however, is applicable for any number of horizontal lines.

The fetching of pixel data from the memory 140 has an additional requirement. There are two ways to fetch S horizontal lines. The first method is to fetch S horizontal lines on a line by line basis. In other words, an entire line is fetched completely before the next line is fetched. The second method is to fetch a group of pixel data in the first line, followed by another group in the next line, and so on, until a group in the S-th line is fetched. Thereafter, the fetching is traversed back to the first line and repeats the sequence. The filtering unit 330 operates on the basis of availability of all S lines simultaneously, but not the entire line. Rather, the filtering unit 330 requires only a portion of pixel data of all S lines. In the embodiment discussed earlier, for example, the filtering unit 330 requires only up to 36 pixels of six consecutive horizontal lines at each operation period.

The first method of fetching is not desirable because it cannot satisfy the processing rate of the pipeline in the filtering unit 330. The filtering unit 330 cannot wait for an entire line to be fetched. The second method of fetching provides a suitable data rate for the pipeline operations in the filtering unit 330.

In summary, the requirements for an efficient access to the SDRAM are: (1) the accesses are made on a group basis, i.e., a group of pixel words is accessed at a time, (2) the group accesses are performed in alternating banks, and (3) the alternating bank accesses are to be maintained when going from one group of pixel data in one line to another group of pixel data in the next line. As will be explained in the following, these requirements are satisfied simply by imposing a requirement on the graphical data. This requirement is stated as follows: The number of pixel words M in the horizontal line is an odd multiple of groups, each having G pixel words, where G is determined based on the number of cycles required to perform the precharge and row activate operations. The significance of this requirement will be explained later.

If M is not an odd multiple of groups having G pixel words, additional pixel locations are padded to each line so that M becomes the next nearest odd multiple of groups having G pixel words. Since G tends to be small compared to the number of pixel words per line, the additional padded pixel words only add an insignificant storage. The benefit of this requirement is that the memory fetching or accessing is optimized at or close to 100% utilization of the SDRAM data rate.

Figure 13:
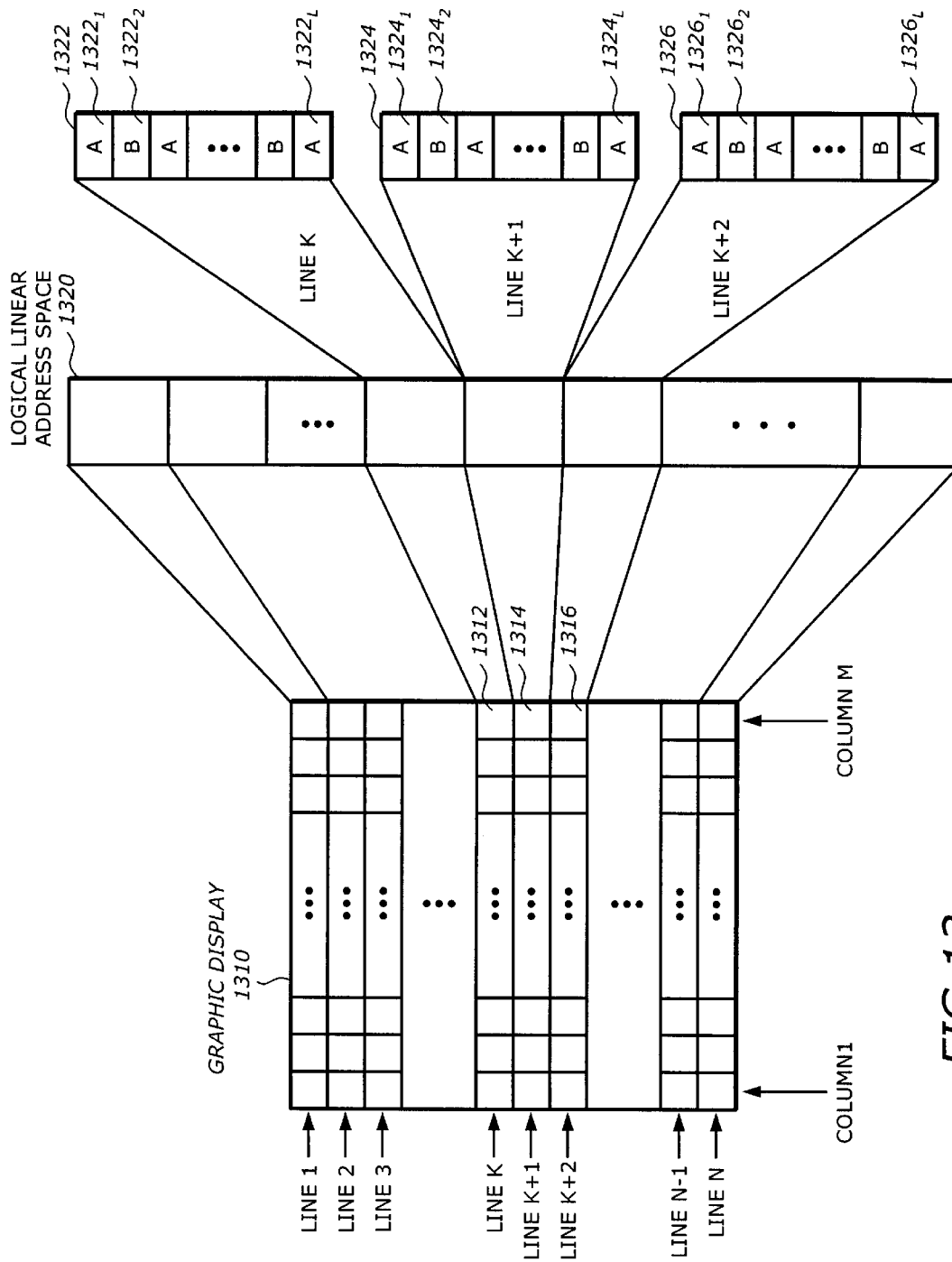
FIG. 13 is a diagram illustrating a mapping of the graphic display to the memory address space according to one embodiment of the invention.

FIG. 13 is a diagram illustrating a mapping of the graphic display to the memory address space according to one embodiment of the invention. The mapping maps a graphic display 1310 to a logical linear address space 1320.

The graphic display 1310 includes N horizontal lines, each having M pixels. In particular, the graphical display 1310 has three consecutive lines: line k 1312, line k+1 1314, and line k+2 1316. The logical linear address space 1320 shows the memory space corresponding to the lines in the graphic display 1310. The addressing is linear in that the addresses of the pixel word are arranged in sequential order in the logical space. The logical space is mapped into the physical memory address space in the synchronous dynamic random access memory (SDRAM) used in the memory 140 (FIG. 1). The mapping can be done by a hardware circuit (e.g. look-up table or permutation of address bits) and/or by software.

The M pixel words in each line are grouped into L groups of the same size G. The number of words (G) in each group is determined based on the number of cycles required to perform the precharge and row activate operations. In one embodiment, each group has eight words, where each word is 32-bit. To satisfy the requirements for an efficient access as discussed above, L is an odd integer number.

The logical linear address space 1320 includes the logical address spaces 1322, 1324, and 1326 corresponding to the lines 1312, 1314, and 1316, respectively. The logical address space 1322 includes L groups $1322_1, 1322_2, \ldots, 1322_L$. The logical address space 1324 includes L groups $1324_1, 1324_2, \ldots, 1324_L$. The logical address space 1326 includes L groups $1326_1, 1326_2, \ldots, 1326_L$.

The groups $1322_1$ to $1322_L$ reside in alternating banks with the first group (group $1322_1$) residing in bank A. Since L is an odd number, if the first group (group $1322_1$) resides in bank A, the last group (group $1322_L$) also resides in bank A. The groups $1324_1$ to $1324_L$ reside in alternating banks with the first group (group $1324_1$) residing in bank B. Since L is an odd number, if the first group (group $1324_1$) resides in bank B; the last group (group $1324_L$) also resides in bank B. The groups $1326_1$ to $1326_L$ reside in alternating banks in a similar manner as the groups $1322_1$ to $1322_L$. It is noted that the banks are alternating not only within a line but also between lines. Since L is an odd number, the sequential alternating bank assignment in the linear address sequence results in alternating bank assignment between lines. The requirement that L is an odd number is to provide alternating banks between lines so that interleaving accesses to the SDRAM are possible to achieve the maximum utilization.

Figure 14:
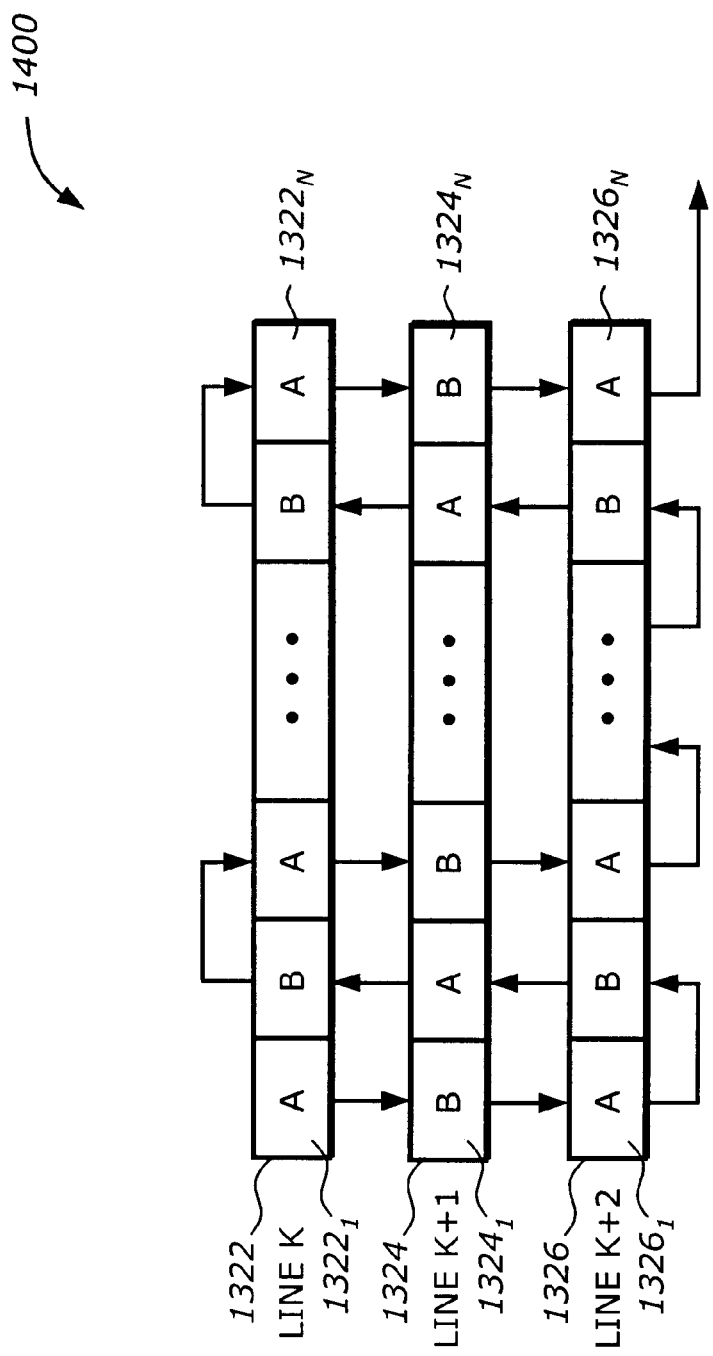
FIG. 14 is a diagram illustrating a memory access pattern according to one embodiment of the invention.

FIG. 14 is a diagram illustrating a memory access pattern 1400 according to one embodiment of the invention.

The access pattern 1400 involves three consecutive lines: line k 1322, line k+1 1324, and line k+2 1326. The line 1322 includes L 8-word groups $1322_1$ to $1322_N$, corresponding to the two banks A and B alternately. Similarly, lines 1324 and 1326 includes L 8-word groups $1324_1$ to $1324_N$ and $1326_1$ to $1326_N$, respectively, each having alternating A and B banks. As is known by one skilled in the art, the technique in this present invention is applicable to memory architectures having more than two banks.

To provide the proper data to filtering unit 330, the access pattern 1400 accesses each 8-word group from one line to the next line on an 8-word group basis, instead of accessing an entire line and then to the next entire line. This accessing sequence provides data to the filtering unit 330 at a suitable rate to accommodate the bandwidth requirement of the display, as discussed before.

The two banks A and B in the memory are accessed sequentially in an alternating fashion resulting in a serpentine pattern. The serpentine pattern is compared to a zigzag pattern as will be explained later.

In the serpentine pattern shown in FIG. 14, the access pattern 1400 goes through the following sequence of groups: $1322_1$ (bank A), $1324_1$ (bank B), $1326_1$ (bank A), $1326_2$ (bank B), $1324_2$ (bank A), $1322_2$ (bank B), $1322_3$ (bank A), $1324_3$ (bank B), $1326_3$ (bank A), ..., $1326_{L-1}$ (bank B), $1324_{L-1}$ (bank A), $1322_{L-1}$ (bank B), $1322_L$ (bank A), $1324_L$ (bank B), and $1326_L$ (bank A). This access pattern goes through alternating banks for all three horizontal lines in each block, resulting in maximum utilization of the SDRAM data rates.

The access pattern 1400 can also be of a zigzag pattern. In this zigzag pattern, the access pattern 1400 goes through the following sequence of groups: $1322_1$ (bank A), $1324_1$ (bank B), $1326_1$ (bank A), $1322_2$ (bank B), $1324_2$ (bank A), $1326_2$ (bank B), $1322_3$ (bank B), $1324_3$ (bank A), $1326_3$ (bank B), ..., $1322_{L-1}$ (bank B), $1324_{L-1}$ (bank A), $1326_{L-1}$ (bank B), $1322_L$ (bank B), $1324_L$ (bank A), and $1326_L$ (bank B). This zigzag pattern also goes through alternating banks for all three consecutive lines. However, the serpentine pattern is preferred to this zigzag pattern for the following reason.

The serpentine pattern is general and works for any number of lines, regardless of whether this number is odd or even. For example, if there are only two lines in each block, it can be readily seen that the serpentine pattern still results in alternating banks ABABABAB ... AB. On the other hand, the zigzag pattern can only work for an odd number of lines and not for an even number of lines. For example, if there are two lines, the zigzag pattern will result in the bank sequence ABBAAB ... BAAB which does not have alternating banks.

Figure 15:
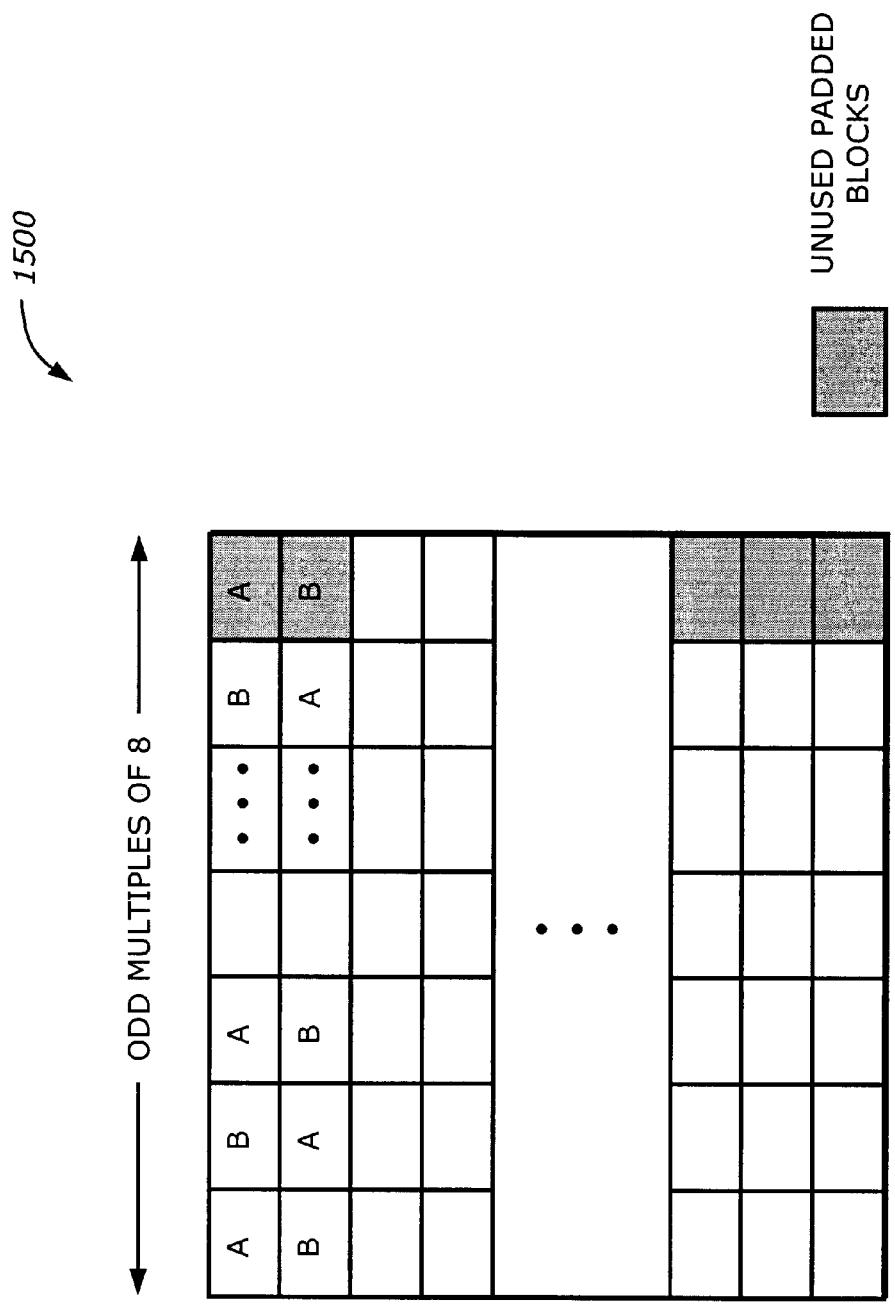
FIG. 15 is a diagram illustrating a graphical display with unused block padding according to one embodiment of the invention.

FIG. 15 is a diagram illustrating a graphical display 1500 with unused block padding according to one embodiment of the invention.

The graphic display 1500 shows the unused padded groups to be included in each horizontal lines so that the total number of groups in each line is an odd multiple of the groups. The number of unused padded blocks is always less than two. It can be one plus a fraction of another block. These unused padded groups incur no additional processing time for both reading and writing. For writing, the addressing simply skips these groups. For reading, the processing unit simply skips these groups.

In most display systems, the number of pixels per line is a multiple of eight. The number of pixels per word may be 1,2,4, 8, or any other suitable numbers. For 1-pixel words, to make the total number of groups of eight words in each line to become odd, it is only necessary to add at most another group of 8 words. This additional word incurs negligible storage and processing time. The following numerical examples illustrate the determination of the number of groups to be added to each horizontal lines. In the following examples, M is the number of pixel words, G is the number of pixel words per group, and L is the number of groups in each horizontal line.

Example 1: M=800, G=8. In this example, L=M/G=100. Since L is not an odd integer number, it is necessary to add G additional words to each line so that M becomes 808.

Then L=808/8=101. The percentage of the additional words for the entire display area is 1/101=0.99%

Example 2: M=700, G=8. In this example, L=M/G=87.5. Since L is not an odd integer number, it is necessary to add an additional 12 words to each line so that M becomes 712. Then L=712/8=89. The percentage of the additional words for the entire display area is 12/712=1.68%.

Therefore, the present invention is a technique to perform graphic and video operations effectively. The technique provides an architecture that performs horizontal and vertical filtering on the graphic data. The filtering operations provide aspect ratio correction and anti-flickering at the display rate. To support the processing rate, an access pattern of the memory is disclosed that provides a maximum utilization of the SDRAM data rates.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus to generate an anti-flickered pixel from a source pixel having a source pixel value in a display memory, the apparatus comprising:
   a plurality of storage elements to store a sequence of pixels in the display memory, the sequence of pixels including the source pixel;
   a filter coupled to the plurality of storage elements to filter the sequence of pixels, the filter generating a filtered pixel corresponding to the source pixel;
   a comparator coupled to the plurality of storage elements to compare the source pixel value with a threshold value, the comparator generating a comparison result;
   an output selector coupled to the filter and the storage elements to select one of the source and filtered pixels according to the comparison result, the selected one of the source and filtered pixels being the anti-flickered pixel; and
   a source selector coupled to the plurality of storage elements to select the source pixel by comparing a pair of pixels in the middle of the sequence of pixels.

2. The apparatus of claim 1 wherein the threshold value is programmable.

3. The apparatus of claim 1 wherein the sequence of pixels corresponds to a vertical sequence of pixels of the display data.

4. The apparatus of claim 3 wherein the display memory stores luminance pixels.

5. The apparatus of claim 1 wherein the output selector selects the filtered pixel if the comparison result indicates that the source pixel value exceeds the threshold value.

6. The apparatus of claim 1 wherein the output selector selects the source pixel if the comparison result indicates that the source pixel value is equal to or less than the threshold value.

7. The apparatus of claim 1 wherein the filter is a non-recursive filter having a variable filter length.

8. The apparatus of claim 7 wherein the variable filter length ranges from one to six.

9. A method to generate an anti-flickered pixel from a source pixel having a source pixel value in a display memory, the method comprising:
   filtering a sequence of pixels stored in a plurality of storage elements, the sequence of pixels including the source pixel, the filter generating a filtered pixel corresponding to the source pixel;
   comparing the source pixel value with a threshold value to generate a comparison result; and
   selecting one of the source and filtered pixels according to the comparison result, the selected one of the source and filtered pixels being the anti-flickered pixel; and
   selecting the source pixel by a source selector by comparing a pair of pixels in the middle of the sequence of pixels.

10. The method of claim 9, wherein the threshold value is programmable.

11. The method of claim 9 wherein the sequence of pixels corresponds to a vertical sequence of pixels of the display data.

12. The method of claim 11 wherein the display memory stores luminance pixels.

13. The method of claim 9 wherein the output selector selects the filtered pixel if the comparison result indicates that the source pixel value exceeds the threshold value.

14. The method of claim 9 wherein the output selector selects the source pixel if the comparison result indicates that the source pixel value is equal to or less than the threshold value.

15. The method of claim 9 wherein the filter is a non-recursive filter having a variable filter length.

16. The method of claim 15 wherein the variable filter length ranges from one to six.

17. A system comprising:
   a display memory storing a source pixel having a source pixel value; and
   a graphics processor coupled to the display memory to generate an anti-flickered pixel from the source pixel, the graphics processor comprising:
      a plurality of storage elements to store a sequence of pixels in the display memory, the sequence of pixels including the source pixel;
      a filter coupled to the plurality of storage elements to filter the sequence of pixels, the filter generating a filtered pixel corresponding to the source pixel;
      a comparator coupled to the plurality of storage elements to compare the source pixel value with a threshold value, the comparator generating a comparison result;
      an output selector coupled to the filter and the storage elements to select one of the source and filtered pixels according to the comparison result, the selected one of the source and filtered pixels being the anti-flickered pixel; and
      a source selector coupled to the plurality of storage elements to select the source pixel by comparing a pair of pixels in the middle of the sequence of pixels.

18. The system of claim 17 wherein the threshold value is programmable.

19. The system of claim 17 wherein the sequence of pixels corresponds to a vertical sequence of pixels of the display data.

20. The system of claim 19 wherein the display memory stores luminance pixels.

21. The system of claim 17 wherein the output selector selects the filtered pixel if the comparison result indicates that the source pixel value exceeds the threshold value.

22. The system of claim 17 wherein the output selector selects the source pixel if the comparison result indicates that the source pixel value is equal to or less than the threshold value.

23. The system of claim 17 wherein the filter is a non-recursive filter having a variable filter length.

24. The system of claim 23 wherein the variable filter length ranges from one to six.

* * * * *